(12) United States Patent
Zhao et al.

(10) Patent No.: US 11,432,142 B2
(45) Date of Patent: Aug. 30, 2022

(54) MULTI-DEVICE WIRELESS CONNECTION METHOD AND DEVICE

(71) Applicant: Huawei Technologies Co., Ltd., Shenzhen (CN)

(72) Inventors: Peng Zhao, Xi'an (CN); Feng Chen, Xi'an (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 442 days.

(21) Appl. No.: 16/493,648

(22) PCT Filed: Jun. 27, 2017

(86) PCT No.: PCT/CN2017/090413
§ 371 (c)(1),
(2) Date: Sep. 12, 2019

(87) PCT Pub. No.: WO2018/166102
PCT Pub. Date: Sep. 20, 2018

(65) Prior Publication Data
US 2020/0008057 A1 Jan. 2, 2020

(30) Foreign Application Priority Data
Mar. 14, 2017 (CN) .......................... 201710149757.0

(51) Int. Cl.
H04W 12/06 (2021.01)
H04W 76/14 (2018.01)
(Continued)

(52) U.S. Cl.
CPC ........... H04W 12/06 (2013.01); H04L 9/0869 (2013.01); H04W 4/80 (2018.02); H04W 12/033 (2021.01);
(Continued)

(58) Field of Classification Search
CPC combination set(s) only.
See application file for complete search history.

(56) References Cited

U.S. PATENT DOCUMENTS 9,451,438 B2    9/2016  Conn et al.
2010/0250604 A1* 9/2010  Chan ................. G06F 16/24524
                                                    707/782
(Continued)

FOREIGN PATENT DOCUMENTS

CN    103618706 A    3/2014
CN    104378145 A    2/2015
(Continued)

OTHER PUBLICATIONS

Andrew, T.S. et al.,"Computer Networks," Fifth Edition, Mar. 2010, 962 pages.

Primary Examiner — Cindy Trandai
(74) Attorney, Agent, or Firm — Slater Matsil, LLP

(57) ABSTRACT

A multi-device wireless connection method and a device. The method includes obtaining device information corresponding to a first account, selecting a second device according to a user-triggered selection instruction and the device information corresponding to the first account, where the second device is a device to which the first account is logged in, sending a pairing request to the server, where the pairing request comprises identification information of the second device, receiving pairing information sent by the server, where the pairing information is used for pairing between the first device and the second device, where the pairing information comprises a first random number which is generated by the server, or by the second device and sent to the server, and performing, by the first device, pairing with the second device according to the pairing information, and implementing a wireless connection between the first device and the second device.

20 Claims, 14 Drawing Sheets

(51) Int. Cl.
  *H04W 4/80* (2018.01)
  *H04L 9/08* (2006.01)
  *H04W 12/033* (2021.01)
  *H04W 12/041* (2021.01)
  *H04W 12/50* (2021.01)

(52) U.S. Cl.
  CPC ......... *H04W 12/041* (2021.01); *H04W 12/50* (2021.01); *H04W 76/14* (2018.02); *H04L 2209/80* (2013.01)

(56) References Cited

U.S. PATENT DOCUMENTS

| | | | |
|---|---|---|---|
| 2012/0272055 A1* | 10/2012 | Jung | H04W 12/08 713/153 |
| 2015/0350865 A1 | 12/2015 | Conn et al. | |
| 2015/0363607 A1* | 12/2015 | Yang | H04L 9/3226 713/165 |
| 2016/0072821 A1 | 3/2016 | Wu | |
| 2016/0105433 A1* | 4/2016 | Ishida | H04W 12/06 726/7 |
| 2016/0285644 A1* | 9/2016 | Lu | H04W 12/50 |
| 2016/0360341 A1* | 12/2016 | Srivatsa | H04W 4/80 |
| 2017/0026778 A1 | 1/2017 | Yamada | |
| 2017/0231022 A1 | 8/2017 | Ito et al. | |
| 2018/0097621 A1* | 4/2018 | Cotta | H04L 9/001 |

FOREIGN PATENT DOCUMENTS

| | | |
|---|---|---|
| CN | 104540132 A | 4/2015 |
| CN | 105281809 A | 1/2016 |
| CN | 108702607 A | 10/2018 |
| WO | 2015199777 A1 | 12/2015 |
| WO | 2016088185 A1 | 6/2016 |
| WO | 2016112860 A1 | 7/2016 |

* cited by examiner

MULTI-DEVICE WIRELESS CONNECTION METHOD AND DEVICE

CROSS REFERENCE TO RELATED APPLICATIONS

This application is a national stage of International Application No. PCT/CN2017/090413, filed on Jun. 27, 2017, which claims priority to Chinese Patent Application No. 201710149757.0, filed on Mar. 14, 2017, both of which are hereby incorporated by reference in their entireties.

TECHNICAL FIELD

Embodiments of the present invention relate to the field of communications technologies, and in particular, to a multi-device wireless connection method and a device

BACKGROUND

With rapid development of communications technologies, more electronic devices with a Bluetooth function, such as a mobile phone, a tablet computer, a wearable device, and an in-vehicle device emerge. A user can connect two or more devices by using a Bluetooth function, to implement information transmission between the devices by using the Bluetooth function, or use one device to control another device, to implement a device remote control operation.

At present, when devices are to be connected by using a Bluetooth function, a user needs to perform an operation in a pairwise connection manner. To be specific, the user first enables Bluetooth functions of two devices, one of the two devices obtains a Bluetooth name of the other device through scanning, and then sends a pairing PIN code to the other device, and the same pairing PIN code is entered into the other device, to complete pairing between the two devices. In this way, a Bluetooth connection between the two devices is implemented. When Bluetooth connections are being implemented between a plurality of devices, the foregoing pairwise connection manner needs to be repeated many times for implementation. In the foregoing method, many times of operations need to be performed for a Bluetooth connection between every two devices. Consequently, operations are complex and time consumption is relatively high. If the method is used to implement Bluetooth connections between a plurality of devices, time consumption is higher and user experience is poor.

SUMMARY OF THE INVENTION

Embodiments of the present invention provide a multi-device wireless connection method and a device, to resolve a prior-art problem that operations are complex and time consumption is high when a multi-device wireless connection is being performed.

The following technical solutions are used in the embodiments of the present invention to achieve the foregoing objective.

According to a first aspect, a multi-device wireless connection method is provided. The method includes obtaining, by a first device from a server, device information corresponding to a first account that is logged in to on the first device, where the first device may be a tablet computer, and the device information may include one or more of a name of the tablet computer, a model of the tablet computer, a sequence number of the tablet computer, a Bluetooth name of the tablet computer, a Bluetooth MAC address of the tablet computer, and the like, selecting a second device according to a user-triggered selection instruction and based on the device information corresponding to the first account, where the second device is a device on which the first account is logged in to, and the second device is, for example, a mobile phone, sending a pairing request to the server, where the pairing request includes identification information of the second device (for example, a name of the mobile phone), and the identification information of the second device may be used by the server to determine the second device, receiving pairing information sent by the server, where the pairing information is used for pairing between the first device and the second device, for example, used for Bluetooth pairing between the first device and the second device, and performing, by the first device, pairing with the second device based on the pairing information, to implement a wireless connection between the first device and the second device. In the foregoing technical solution, the first device may directly obtain, from the server, the device information corresponding to the first account, and in a process of implementing the wireless connection between the first device and the second device, a user only needs to select the second device based on the device information corresponding to the first account, to implement the wireless connection between the first device and the second device, without performing a series of complex operations on each device. This reduces an operation time and simplifies an operation procedure. In addition, device information of a plurality of devices of the same user is presented to the user for selection. This can reduce a selection range and avoid incorrect selection, thereby improving user experience.

In a possible implementation of the first aspect, the method further includes sending device information of the first device to the server when a preset condition is satisfied, where the preset condition includes one of the following conditions: the first account is logged in to on the first device for the first time, where the first account may be an account used to log in to on the first device, or may be an account used to log in to an application program on the first device, or device information of the first device changes. For example, a device name of the first device or a Bluetooth name of the first device changes. In the possible implementation, the first device may send the device information of the first device to the server under the preset condition, so as to avoid sending the device information to the server each time the first account is logged in to on the first device. This reduces interactions between the first device and the server, and can also ensure freshness of the device information.

In a possible implementation of the first aspect, the pairing information includes a first random number or a key, the first random number is generated by the server, or is generated by the second device and sent to the server, and the key is generated by the server. In the possible implementation, the pairing information is generated and stored by the server, or is generated by the second device and sent to the server for storage, to ensure security of the pairing information. In addition, when the pairing information includes the key generated by the server, efficiency of pairing between the first device and the second device can be further improved.

In a possible implementation of the first aspect, if the pairing information includes the first random number, the performing, by the first device, pairing with the second device based on the pairing information includes generating a second random number, and determining first authentication information based on the first random number and the second random number, where the first authentication information may be a random number, a character, a character string, or the like, and sending the second random number and the first authentication information to the second device, where the first authentication information is used by the second device to perform validity authentication on the first device. In the possible implementation, the first device may send the first authentication information to the second device, so that the second device performs validity authentication on the first device, thereby ensuring security of the wireless connection.

In a possible implementation of the first aspect, the performing, by the first device, pairing with the second device based on the pairing information further includes receiving a third random number and second authentication information that are sent by the second device, where the second authentication information is used by the first device to perform validity authentication on the second device, and performing authentication on the second authentication information based on the first random number and the third random number. In the possible implementation, the first device may receive the second authentication information sent by the second device, and perform validity authentication on the second device, thereby ensuring security of the wireless connection.

In a possible implementation of the first aspect, the performing, by the first device, pairing with the second device based on the pairing information further includes generating a key based on the first random number, where the key is used by the first device and the second device to encrypt and decrypt data. In the possible implementation, the key used for data encryption and decryption is generated, so that data security can be ensured during data transmission.

In a possible implementation of the first aspect, a user account that is logged in to on the first device is the same as or different from the first account, and when the user account that is logged in to on the first device is different from the first account, before the obtaining, by a first device from a server, device information corresponding to a first account, the method further includes obtaining the first account.

In a possible implementation of the first aspect, if a third device is wirelessly connected to the first device, and the third device is incapable of account login, the method further includes sending, by the first device, device information of the third device to the server.

According to a second aspect, a multi-device wireless connection method is provided. The method includes obtaining, by a second device, pairing information, where the pairing information is used for pairing between a first device and the second device, and performing, by the second device, pairing with the first device based on the pairing information, to implement a wireless connection between the first device and the second device, where the second device is a device on which a first account is logged in to and the second device is a device that is selected by the first device according to a user-triggered selection instruction and based on device information corresponding to the first account, the first device is a device sending a pairing request to a server, and the pairing request includes identification information of the second device. In the foregoing technical solution, in a process of implementing the wireless connection between the first device and the second device, the second device may obtain the pairing information and perform pairing with the first device based on the pairing information, to implement the wireless connection between the first device and the second device, and a user does not need to perform a series of complex operations on each device. This reduces an operation time and simplifies an operation procedure. In addition, when the second device is being selected, device information of a plurality of devices of the same user is presented to the user for selection. This can reduce a selection range and avoid incorrect selection, thereby improving user experience.

In a possible implementation of the second aspect, the method further includes sending device information of the second device to the server when a preset condition is satisfied, where the preset condition includes one of the following conditions: the first account is logged in to on the second device for the first time, or device information of the second device changes. In the possible implementation, the second device may send the device information of the second device to the server under the preset condition, so as to avoid sending the device information to the server each time the first account is logged in to on the second device. This reduces interactions between the second device and the server, and can also ensure freshness of the device information.

In a possible implementation of the second aspect, after the obtaining, by a second device, pairing information, the method further includes setting a status of the second device to a connectable state. In the possible implementation, after obtaining the pairing information, the second device can automatically set the status of the second device to the connectable state, so that the user does not need to manually perform an operation, and therefore the operation procedure is simplified.

In a possible implementation of the second aspect, the pairing information includes a first random number or a key, the first random number is generated by the server, or is generated by the second device and sent to the server, and the key is generated by the server. In the possible implementation, the pairing information is generated and stored by the server, or is generated by the second device and sent to the server for storage, to ensure security of the pairing information. In addition, when the pairing information includes the key generated by the server, efficiency of pairing between the first device and the second device can be further improved.

In a possible implementation of the second aspect, if the pairing information includes the first random number, the performing, by the second device, pairing with the first device based on the pairing information includes receiving a second random number and first authentication information that are sent by the first device, where the first authentication information is used by the second device to perform validity authentication on the first device, and performing authentication on the first authentication information based on the first random number and the second random number. In the possible implementation, the second device may receive the first authentication information sent by the first device, and perform validity authentication on the first device, thereby ensuring security of the wireless connection.

In a possible implementation of the second aspect, the performing, by the second device, pairing with the first device based on the pairing information further includes generating a third random number, and determining second authentication information based on the first random number and the third random number, and sending the third random number and the second authentication information to the first device, where the second authentication information is used by the first device to perform validity authentication on the second device. In the possible implementation, the second device may send the second authentication information to the first device, so that the first device performs validity authentication on the second device, thereby ensuring security of the wireless connection.

In a possible implementation of the second aspect, the performing, by the second device, pairing with the first device based on the pairing information further includes generating a key based on the first random number, where the key is used by the first device and the second device to encrypt and decrypt data. In the possible implementation, the key used for data encryption and decryption is generated, so that data security can be ensured during data transmission.

In a possible implementation of the second aspect, a user account that is logged in to on the first device is the same as or different from the first account.

In a possible implementation of the second aspect, if a third device is wirelessly connected to the second device, and the third device is incapable of account login, the method further includes sending, by the second device, device information of the third device to the server.

According to a third aspect, a multi-device wireless connection method is provided. The method includes sending device information, corresponding to a first account, in a stored correspondence between a user account and device information to a first device, receiving a pairing request sent by the first device, where the pairing request includes identification information of a second device, and the second device is a device that is selected by the first device according to a user-triggered selection instruction and based on the device information corresponding to the first account, and sending pairing information to the first device, to implement a wireless connection between the first device and the second device, where the pairing information is used for pairing between the first device and the second device. In the foregoing technical solution, a server may send the device information corresponding to the first account to the first device, so that the first device selects the second device based on the device information corresponding to the first account, and send the pairing information to the first device when receiving the pairing request of the first device. In this way, a user does not need to perform a series of complex operations on each device to implement the wireless connection between the first device and the second device. This reduces an operation time and simplifies an operation procedure. In addition, device information of a plurality of devices of the same user is presented to the user for selection. This can reduce a selection range and avoid incorrect selection, thereby improving user experience.

In a possible implementation of the third aspect, the method further includes receiving the device information corresponding to the first account, and storing the device information corresponding to the first account into the correspondence between a user account and device information. In the possible implementation, the server may receive device information that is sent under a preset condition by a device on which the first account is logged in to, and correspondingly store the device information, so as to avoid receiving the device information sent by the device, each time the first account is logged in to on the device. This reduces interactions between the device and the server, and can also ensure freshness of the device information.

In a possible implementation of the third aspect, the pairing information includes a first random number or a key, the first random number is generated by a server, or is generated by the second device and sent to a server, and the key is generated by the server. In the possible implementation, the pairing information is generated by a server, or is generated by the second device and sent to a server for storage, to ensure security of the pairing information. In addition, when the pairing information includes the key generated by the server, efficiency of pairing between the first device and the second device can be further improved.

In a possible implementation of the third aspect, if the pairing information includes the first random number, when the first random number is generated by the server, the method further includes generating the first random number, and sending the first random number to the second device, or when the first random number is generated by the second device, the method further includes receiving the first random number sent by the second device. In the possible implementation, when the pairing information includes the first random number, the server may generate the first random number, and send the first random number to the first device and the second device, to ensure security of the first random number.

In a possible implementation of the third aspect, if the pairing information includes the key, the method further includes generating the key, where the key is used by the first device and the second device to encrypt and decrypt data, and sending the key to the second device. In the possible implementation, when the pairing information includes the key, the server may generate the key, and send the key to the first device and the second device, to ensure security of the key and improve efficiency of pairing between the first device and the second device.

In a possible implementation of the third aspect, a user account that is logged in to on the first device is the same as or different from the first account, and if the user account that is logged in to on the first device is different from the first account, the method further includes receiving device information corresponding to the user account that is logged in to on the first device, and storing the device information corresponding to the user account into the correspondence between a user account and device information.

In a possible implementation of the third aspect, if a third device is wirelessly connected to the second device or the first device, and the third device is incapable of account login, the method further includes receiving device information of the third device, and storing the device information of the third device into the correspondence between a user account and device information.

According to a fourth aspect, a device is provided. The device is used as a first device and includes an obtaining unit, configured to obtain, from a server, device information corresponding to a first account, a selection unit, configured to select a second device according to a user-triggered selection instruction and based on the device information corresponding to the first account, where the second device is a device on which the first account is logged in to, a sending unit, configured to send a pairing request to the server, where the pairing request includes identification information of the second device, a receiving unit, configured to receive pairing information sent by the server, where the pairing information is used for pairing between the first device and the second device, and a pairing unit, configured to perform, for the first device, pairing with the second device based on the pairing information, to implement a wireless connection between the first device and the second device.

In a possible implementation of the fourth aspect, the sending unit is further configured to send device information of the first device to the server when a preset condition is satisfied, where the preset condition includes one of the following conditions: the first account is logged in to on the first device for the first time, or device information of the first device changes.

In a possible implementation of the fourth aspect, the pairing information includes a first random number or a key, the first random number is generated by the server, or is generated by the second device and sent to the server, and the key is generated by the server.

In a possible implementation of the fourth aspect, if the pairing information includes the first random number, the pairing unit is further configured to generate a second random number, and determine first authentication information based on the first random number and the second random number, and the sending unit is further configured to send the second random number and the first authentication information to the second device, where the first authentication information is used by the second device to perform validity authentication on the first device.

In a possible implementation of the fourth aspect, the receiving unit is further configured to receive a third random number and second authentication information that are sent by the second device, where the second authentication information is used by the first device to perform validity authentication on the second device, and the pairing unit is further configured to perform authentication on the second authentication information based on the first random number and the third random number.

In a possible implementation of the fourth aspect, the pairing unit is further configured to generate a key based on the first random number, where the key is used by the first device and the second device to encrypt and decrypt data.

In a possible implementation of the fourth aspect, a user account that is logged in to on the first device is the same as or different from the first account, and when the user account that is logged in to on the first device is different from the first account, the obtaining unit is further configured to obtain the first account.

In a possible implementation of the fourth aspect, if a third device is wirelessly connected to the first device, and the third device is incapable of account login, the sending unit is further configured to send, for the first device, device information of the third device to the server.

According to a fifth aspect, a device is provided. The device is used as a second device and includes an obtaining unit, configured to obtain pairing information, where the pairing information is used for pairing between a first device and the second device, the second device is a device on which a first account is logged in to and the second device is a device that is selected by the first device according to a user-triggered selection instruction and based on device information corresponding to the first account, the first device is a device sending a pairing request to a server, and the pairing request includes identification information of the second device, and a pairing unit, configured to perform pairing with the first device based on the pairing information, to implement a wireless connection between the first device and the second device.

In a possible implementation of the fifth aspect, the device further includes a sending unit, configured to send device information of the second device to the server when a preset condition is satisfied, where the preset condition includes one of the following conditions: the first account is logged in to on the second device for the first time, or device information of the second device changes.

In a possible implementation of the fifth aspect, the method further includes a setting unit, configured to set a status of the second device to a connectable state.

In a possible implementation of the fifth aspect, the pairing information includes a first random number or a key, the first random number is generated by the server, or is generated by the second device and sent to the server, and the key is generated by the server.

In a possible implementation of the fifth aspect, if the pairing information includes the first random number, a receiving unit is further configured to receive a second random number and first authentication information that are sent by the first device, where the first authentication information is used by the second device to perform validity authentication on the first device, and the pairing unit is further configured to perform authentication on the first authentication information based on the first random number and the second random number.

In a possible implementation of the fifth aspect, the pairing unit is further configured to generate a third random number, and determine second authentication information based on the first random number and the third random number, and the sending unit is further configured to send the third random number and the second authentication information to the first device, where the second authentication information is used by the first device to perform validity authentication on the second device.

In a possible implementation of the fifth aspect, the pairing unit is further configured to generate a key based on the first random number, where the key is used by the first device and the second device to encrypt and decrypt data.

In a possible implementation of the fifth aspect, a user account that is logged in to on the first device is the same as or different from the first account.

In a possible implementation of the fifth aspect, if a third device is wirelessly connected to the second device, and the third device is incapable of account login, the sending unit is further configured to send, for the second device, device information of the third device to the server.

According to a sixth aspect, a server is provided. The server includes a sending unit, configured to send device information, corresponding to a first account, in a stored correspondence between a user account and device information to a first device, and a receiving unit, further configured to receive a pairing request sent by the first device, where the pairing request includes identification information of a second device, and the second device is a device that is selected by the first device according to a user-triggered selection instruction and based on the device information corresponding to the first account. The sending unit is further configured to send pairing information to the first device, to implement a wireless connection between the first device and the second device, where the pairing information is used for pairing between the first device and the second device.

In a possible implementation of the sixth aspect, the receiving unit is further configured to receive the device information corresponding to the first account, and the server further includes a storage unit, configured to store the device information corresponding to the first account into the correspondence between a user account and device information.

In a possible implementation of the sixth aspect, the pairing information includes a first random number or a key, the first random number is generated by the server, or is generated by the second device and sent to the server, and the key is generated by the server.

In a possible implementation of the sixth aspect, if the pairing information includes the first random number, when the first random number is generated by the server, the server further includes a generation unit, configured to generate the first random number, and the sending unit is configured to send the first random number to the second device, or when the first random number is generated by the second device, the receiving unit is further configured to receive the first random number sent by the second device.

In a possible implementation of the sixth aspect, if the pairing information includes the key, the server further includes a generation unit, configured to generate the key, where the key is used by the first device and the second device to encrypt and decrypt data, and the sending unit is further configured to send the key to the second device.

In a possible implementation of the sixth aspect, a user account that is logged in to on the first device is the same as or different from the first account, and if the user account that is logged in to on the first device is different from the first account, the receiving unit is further configured to receive device information corresponding to the user account that is logged in to on the first device, and the storage unit is further configured to store the device information corresponding to the user account into the correspondence between a user account and device information.

In a possible implementation of the sixth aspect, if a third device is wirelessly connected to the second device or the first device, and the third device is incapable of account login, the receiving unit is further configured to receive device information of the third device, and the storage unit is further configured to store the device information of the third device into the correspondence between a user account and device information.

According to another aspect of this application, a device is provided. The device may be used as a first device, and a structure of the device includes a processor and a communications interface. The processor is configured to support the device in performing a function of the first device in the method provided in any one of the first aspect or the possible implementations of the first aspect. The communications interface is configured to support communication between the device and another network element. The device may further include a memory. The memory is configured to be coupled to the processor, and the memory stores program code and data that are necessary for the device.

According to another aspect of this application, a device is provided. The device is used as a second device, and a structure of the device includes a processor and a communications interface. The processor is configured to support the device in performing a function of the second device in the method provided in any one of the second aspect or the possible implementations of the second aspect. The communications interface is configured to support communication between the device and another network element. The device may further include a memory. The memory is configured to be coupled to the processor, and the memory stores program code and data that are necessary for the device.

According to another aspect of this application, a server is provided. A structure of the server includes a processor and a communications interface. The processor is configured to support the device in performing a function performed by the server in the method provided in any one of the third aspect or the possible implementations of the third aspect. The communications interface is configured to support communication between the device and another network element. The device may further include a memory. The memory is configured to be coupled to the processor, and the memory stores program code and data that are necessary for the device.

According to another aspect of this application, a communications system is provided. The system includes any first device provided in the foregoing aspects, and/or any second device provided in the foregoing aspects, and/or any server provided in the foregoing aspects.

According to another aspect of this application, a computer-readable storage medium is provided, where the computer-readable storage medium stores an instruction. When the instruction runs on a computer, the computer is enabled to perform the information processing method provided in the foregoing aspects.

According to another aspect of this application, a computer program product including an instruction is provided. When the computer program product runs on a computer, the computer is enabled to perform the information processing method provided in the foregoing aspects.

It can be understood that the devices in the multi-device connection methods, the computer storage medium, and the computer program product that are provided above are all used for performing the corresponding methods provided above. Therefore, for achievable beneficial effects thereof, refer to the beneficial effects in the corresponding methods provided above. Details are not described herein again.

DETAILED DESCRIPTION OF ILLUSTRATIVE EMBODIMENTS

Figure 1:
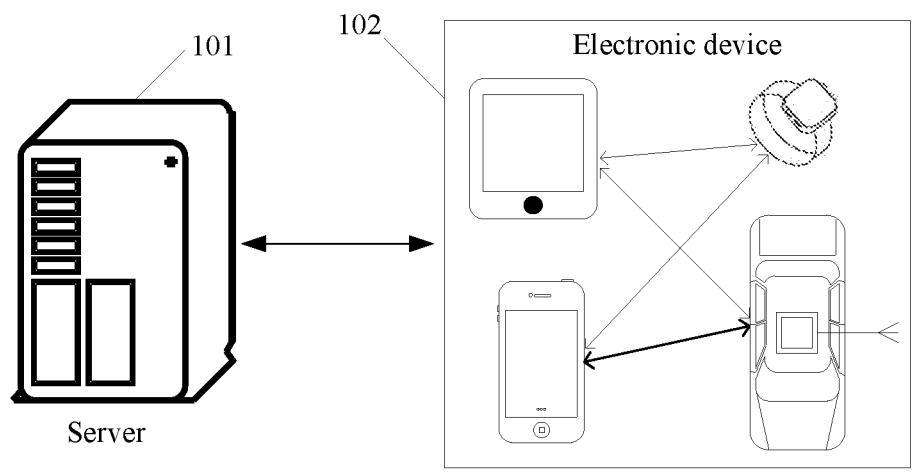
FIG. 1 is a system architectural diagram of a communications system according to an embodiment of the present invention.

Technical solutions described in this application may be applicable to a global system for mobile communications (GSM) system, a code division multiple access (CDMA) system, a wideband code division multiple access (WCDMA) system, a long term evolution (LTE) system, a 5th generation communications system, a future mobile communications system, and the like. FIG. 1 is a system architectural diagram of a communications system according to an embodiment of the present invention. The communications system includes a server 101 and electronic devices 102. The server 101 and the electronic devices 102 all have data processing and data storage functions, and data transmission may be further performed between the server 101 and the electronic devices 102, and between the electronic devices 102.

Figure 2:
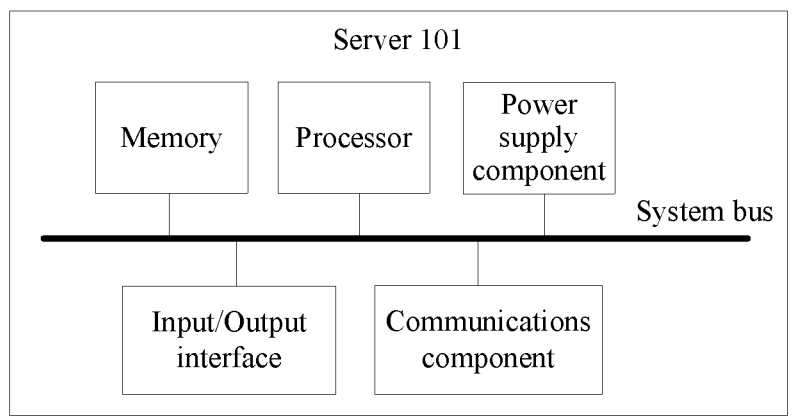
FIG. 2 is a schematic structural diagram of a server according to an embodiment of the present invention.

The server 101 refers to a network device that provides a service for the electronic device 102. For example, the server 101 may be a computer having a function of a server. Referring to FIG. 2, the server 101 includes a memory, a processor, a system bus, a power supply component, an input\output interface, a communications component, and the like. The memory may be configured to store data, a software program, and a module, and mainly includes a program storage area and a data storage area. The program storage area may store an operating system, an application program that is required by at least one function, and the like. The data storage area may store data created based on use of the server 101, and the like. The processor performs various functions and data processing of the server Dolby running or executing the software program and/or the module that are/is stored in the memory and by invoking the data stored in the memory. The system bus includes an address bus, a data bus, and a control bus, and is configured to transmit data and an instruction. The power supply component is configured to supply power to various components of the server 101. The input \ output interface provides an interface between the processor and a peripheral interface module. The communications component is configured to perform wired or wireless communication between the server 101 and another device. In the communications system, the server 101 is responsible for critical tasks such as data storage, forwarding, and distribution, and is an indispensable and important component in various networks based on a client/server (C/S) mode or a browser/server (B/S) mode.

Figure 3:
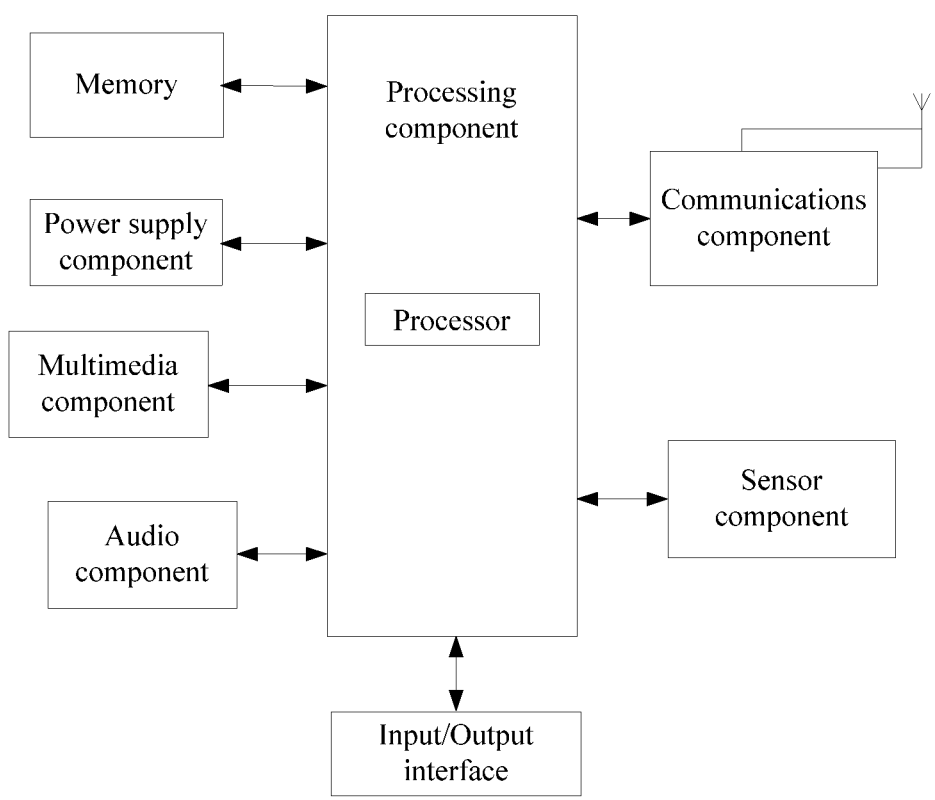
FIG. 3 is a schematic structural diagram of an electronic device according to an embodiment of the present invention.

Moreover, as served objects in the communications system, the electronic devices 102 may include two or more devices. The device may be a mobile phone, a tablet computer, a notebook computer, a wearable device, an in-vehicle device, a portable device, or the like. Referring to FIG. 3, an example in which the electronic device 102 is a mobile phone is used for description. The electronic device 102 may include a processing component, a memory, a power supply component, a multimedia component, an audio component, an input/output interface, a sensor component, a communications component, and the like.

The processing component usually controls overall operations of the electronic device 102, such as operations associated with displaying, telephone calling, data communication, a camera operation, and a record operation. The processing component may include one or more processors to execute the instruction. In addition, the processing component may include one or more modules to facilitate an interaction between the processing component and another component. For example, the processing component may include a multimedia module to facilitate an interaction between the multimedia component and the processing component.

The memory is configured to store various types of data to support the operations of the electronic device 102. An example of such data includes an instruction for any application program or method operated on the electronic device 102, contact data, phone book data, a message, an image, a video, and the like. The memory may be implemented by any type of volatile or non-volatile storage device or a combination thereof, for example, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc.

A power component supplies power to various components of the electronic device 102. The power component may include a power management system, one or more power supplies, and another component associated with power generation, power management, and power distribution of the electronic device 102.

The multimedia component includes a screen that provides an output interface between the electronic device 102 and a user. In some embodiments, the screen may be a liquid crystal display (LCD) or a touch panel (TP). If the screen is the touch panel, the screen may be implemented as a touchscreen, to receive an input signal from the user. The touch panel includes one or more touch sensors, to sense a touch, a slide, and a gesture on the touch panel. The touch sensor may not only sense a boundary of a touch or slide action, but also detect duration and pressure related to the touch or slide operation. In some embodiments, the multimedia component includes a camera. When the electronic device 102 is in an operating mode, for example, a photographing mode or a video mode, the camera may receive external multimedia data. Each camera may be a fixed optical lens system or have focusing and optical zooming capabilities.

The audio component is configured to output and/or input an audio signal. For example, the audio component includes a microphone (MC). When the electronic device 102 is in an operating mode, for example, a call mode, a recording mode, or a speech recognition mode, the microphone is configured to receive an external audio signal. The received audio signal may be further stored in the memory, or may be sent by using the communications component. In some embodiments, the audio component further includes a speaker, configured to output an audio signal.

The input/output interface provides an interface between the processing component and a peripheral interface module. The peripheral interface module may be a click wheel, buttons, or the like. The buttons may include but are not limited to a home button, a start button, and a lock button.

The sensor component includes one or more sensors, and is configured to provide evaluation of various statuses for the electronic device 102. For example, the sensor component may detect an on/off state of the electronic device 102 and a relative location of the component. The sensor component may further detect a location change of the electronic device 102 or a location change of a component of the electronic device 102, a direction or acceleration/deceleration of the electronic device 102, and a temperature change of the electronic device 102. The sensor component may include a proximity sensor, configured to detect presence of a nearby object without any physical contact. The sensor component may further include a light sensor, such as a complimentary metal-oxide semiconductor (CMOS) or charge couple device (CCD) image sensor, configured to be used in an imaging application. In some embodiments, the sensor component may further include an acceleration sensor, a gyro sensor, a magnetic sensor, a pressure sensor, or a temperature sensor.

The communications component is configured to facilitate wired or wireless communication between the electronic device 102 and another device. The electronic device 102 may access a wireless network that is based on a communication standard, such as WiFi, 2G, 3G, or a combination thereof. In an example embodiment, the communications component receives, through a broadcast channel, a broadcast signal or broadcast-related information from an external broadcast management system. In an example embodiment, the communications component further includes a near field communication (NFC) module to facilitate short-range communication. For example, the NFC module may be implemented based on a radio frequency identification (RFD) technology, an infrared data association (rDA) technology, an ultra-wideband (UWB) technology, a Bluetooth (BT) technology, or another technology.

A person skilled in the art can understand that structures of the server and the electronic device shown in FIG. 2 and FIG. 3 do not constitute any limitation on structures of the server and the electronic device. In actual application, the server or the electronic device may include more or fewer components than those shown in the figure, or a combination of some components, or components differently disposed.

Figure 4:
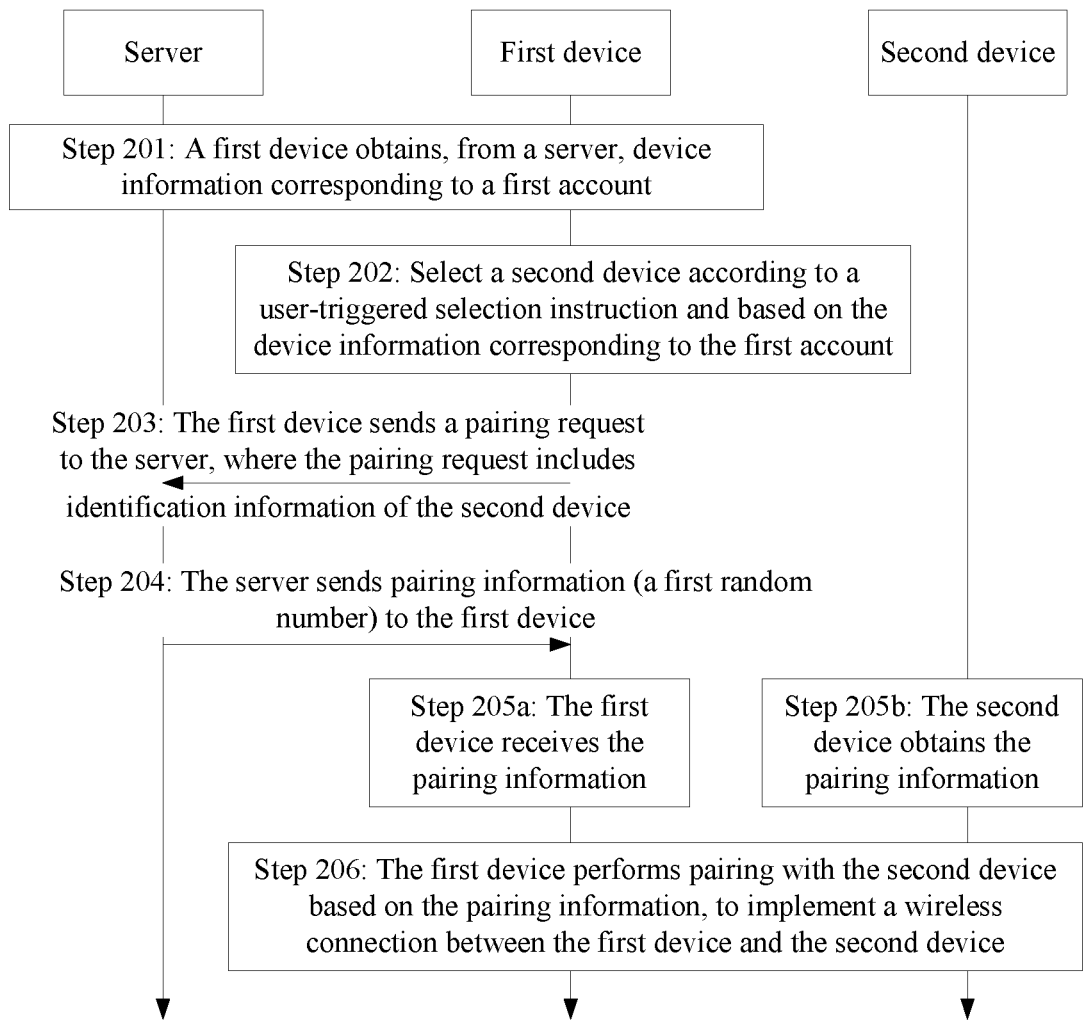
FIG. 4 is a schematic flowchart of a first multi-device wireless connection method according to an embodiment of the present invention.

FIG. 4 is a schematic flowchart of a multi-device wireless connection method according to an embodiment of this application. The method is applied to the communications system shown in FIG. 1. Referring to FIG. 4, the method includes the following several steps.

Step 201: A first device obtains, from a server, device information corresponding to a first account.

The first device may be a mobile phone, a tablet computer, a notebook computer, a wearable device, an in-vehicle device, a portable device, or the like. The first device includes a wireless communications module and has a wireless connection function. For example, the first device has a Bluetooth module, and can implement a wireless connection to another electronic device by using a Bluetooth function.

Moreover, the first account may be an account that is logged in to on the first device, or may be an account that is logged in to on another device, and is an account that is logged in to on a device to which the first device needs to be connected. That the first account is a user account that is logged in to on the first device is used as an example for description herein. The first account that is logged in to on the first device is the user account that is logged in to on the first device. The first account may be an account used to log in to the first device, or may be an account used to log in to an application program installed on the first device. This is not specifically limited in this embodiment of this application. The device information corresponding to the first account is device information of an electronic device on which the first account is logged in to. The device information may include one or more of the following information: a name of the electronic device, a model of the electronic device, a sequence number of the electronic device, a media access control (MAC) address of the electronic device, a name of a wireless communications module in the electronic device, a model of the wireless communications module, a sequence number of the wireless communications module, a MAC address of the wireless communications module, and the like.

Specifically, when the first device obtains, from the server, the device information corresponding to the first account that is logged in to on the first device, the first device may send, to the server, an information obtaining request carrying the first account. After receiving the information obtaining request, the server sends the device information, corresponding to the first account, in a stored correspondence between a user account and device information to the first device based on the first account.

Optionally, the first device may proactively send the information obtaining request to the server, or may send the information obtaining request to the server after receiving a user-triggered instruction. For example, the first device has a Bluetooth function. When a user starts a Bluetooth setting of the first device, the first device may automatically obtain, from the server, the device information corresponding to the first account. Alternatively, a specified button is set on a Bluetooth setting screen or a dedicated application program screen, and when a user triggers the specified button, the first device sends the information obtaining request to the server.

Step 202: The first device selects a second device according to a user-triggered selection instruction and based on the device information corresponding to the first account, where the second device is a device on which the first account is logged in to.

Similarly, the second device may be a mobile phone, a tablet computer, a notebook computer, a wearable device, an in-vehicle device, a portable device, or the like. The second device also includes a wireless communications module and has a wireless connection function. For example, the second device has a Bluetooth module, and can implement a wireless connection to the first device or another electronic device by using a Bluetooth function. The first account is logged in to on both the second device and the first device, and the second device may be a device that is selected by the user from devices on which the first account is logged in to.

Figure 5:
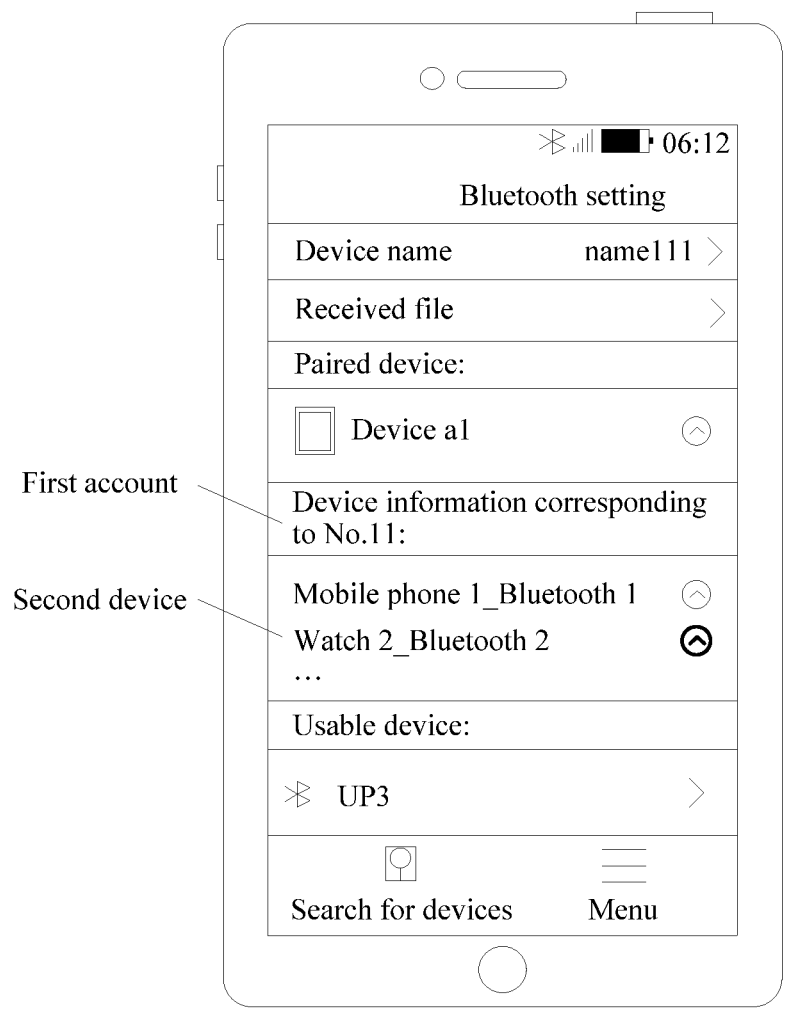
FIG. 5 is a diagram of a screen displaying device information corresponding to a first account according to an embodiment of the present invention.

Specifically, when the first device obtains the device information corresponding to the first account, the first device may display the device information to the user, and the user may trigger the selection instruction, where the selection instruction is used to select the second device, so that the first device selects the second device according to the user-triggered selection instruction and based on the device information corresponding to the first account. For example, the first account is No. 11, if device information of each device includes a device name and a Bluetooth name, and the device information corresponding to the first account includes mobile phone 1 Bluetooth 1 and watch 2 Bluetooth 2, the device information corresponding to the first account may be shown in FIG. 5. The user may select a corresponding device by tapping device information of each device, or select a corresponding device by tapping a selection button corresponding to device information of each device. That the user taps a selection button to select the watch 2 as the second device is used as an example for description in FIG. 5.

Step 203: The first device sends a pairing request to the server, where the pairing request includes identification information of the second device.

The identification information of the second device is used to identify the second device, and the identification information of the second device may be device information of the second device. When the device information of the second device includes a plurality of pieces of information, the identification information of the second device may be one of the plurality of pieces of information. For example, the device information of the second device includes a name of a mobile phone, a MAC address of the mobile phone, and a Bluetooth MAC address. In this case, the identification information of the second device may be the Bluetooth MAC address, and certainly may alternatively be other information. This is not limited in this embodiment of this application.

Specifically, after selecting the second device, the first device may send the pairing request including the identification information of the second device to the server, where the pairing request is used to request pairing between the first device and the second device. Pairing means performing a series of actions to make both to-be-paired devices have a same key. The key may be used for data encryption and decryption during communication. In this embodiment of this application, the first device performs pairing with the second device, that is, makes the first device and the second device finally have a same key used for data encryption and decryption.

Step 204: When receiving the pairing request, the server sends pairing information to the first device, where the pairing information is used for pairing between the first device and the second device.

After receiving the pairing request, the server may determine the second device based on an identifier of the second device included in the pairing request, and send, to the first device, the pairing information used for pairing between the first device and the second device.

Optionally, the pairing information may include a first random number or a key, the first random number may be used for pairing between the first device and the second device, and the key is a key used by the first device and the second device to encrypt and decrypt data. When the pairing information includes different information, a corresponding operation performed by the server is slightly different. Details are as follows.

Figure 6:
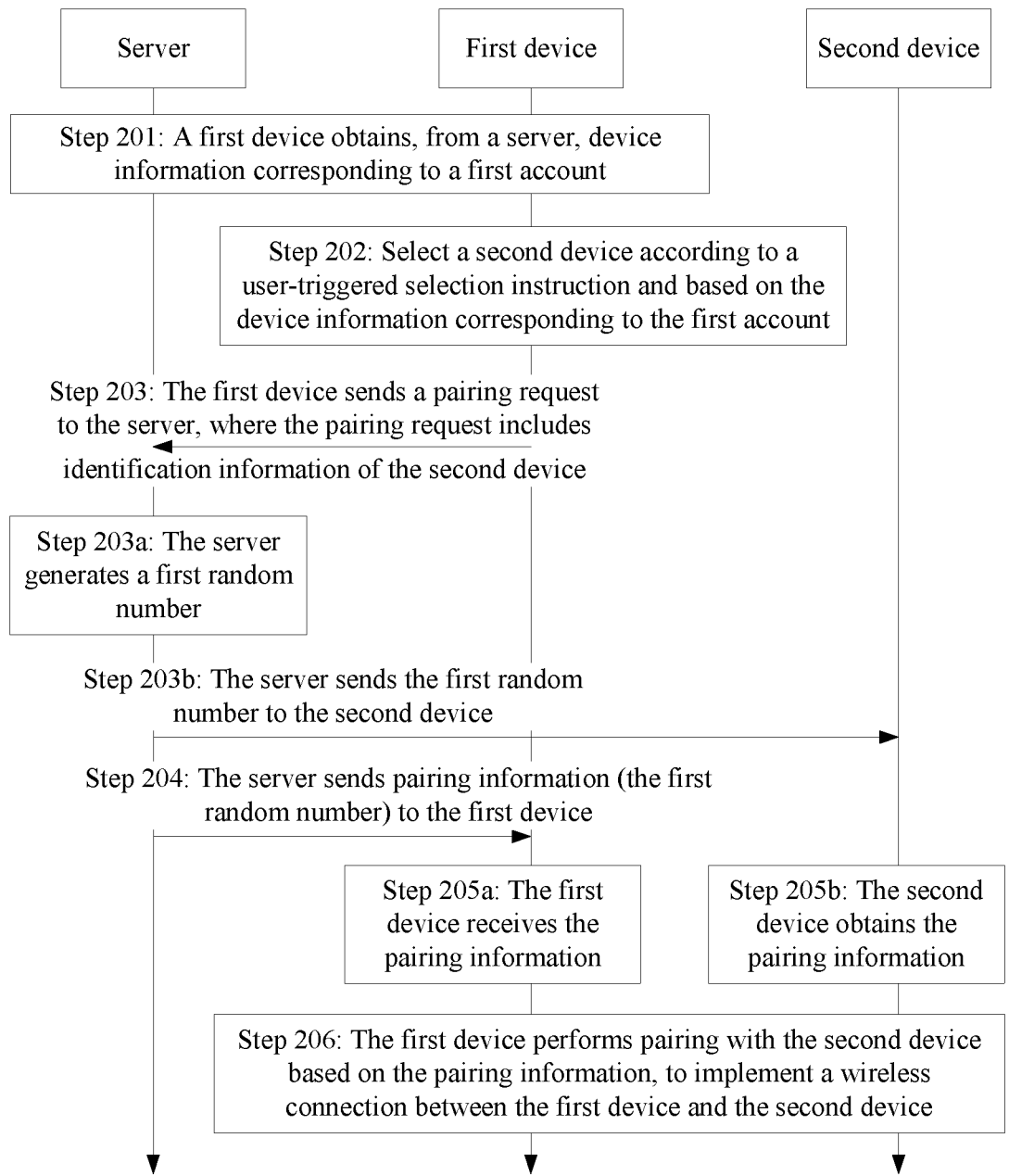
FIG. 6 is a schematic flowchart of a second multi-device wireless connection method according to an embodiment of the present invention.

First type: The pairing information includes the first random number, and the first random number is generated by the server. As shown in FIG. 6, after step 203, the method further includes step 203*a* and step 203*b*. Step 203*a* is prior to step 204, and step 203*b* and step 204 may be performed in no particular order.

Step 203*a*: The server generates the first random number.

When generating the first random number, the server may generate the random number according to an algorithm by using time (for example, xx (month) xx (day), xx (year)) as a factor, or may generate the random number by using a random-number generation method in the prior art. A method for generating the first random number by the server and an algorithm used for generating the first random number are not specifically limited in this embodiment of this application.

Specifically, when receiving the pairing request sent by the first device, the server may generate the first random number for the first device and the second device, and send the first random number to the first device by performing step 204.

Step 203*b*: The server sends the first random number to the second device.

After generating the first random number, the server may send the first random number to both the first device and the second device, to ensure security of the first random number. Optionally, the server may further send device information of the first device to the second device. For example, the server may send a MAC address of the first device to the second device, so that the second device determines that a to-be-connected device is the first device. In actual application, the server may alternatively send, to the second device, other information used to identify the first device. This is not specifically limited in this embodiment of this application.

Further, when receiving the first random number, the second device may set a status of the second device to a connectable state. The connectable state may also be referred to as a broadcast state. In this way, the user does not need to manually perform an operation, and therefore an operation procedure is simplified. For example, the second device has a Bluetooth function. When receiving the first random number, the second device may automatically enable the Bluetooth function, and set an attribute of the second device to a state in which the second device can be detected by another device. Then, the first device may send a wireless physical connection (for example, a Bluetooth physical connection) request to the second device, or the second device sends a wireless physical connection request to the first device after determining that the to-be-connected device is the first device.

Figure 7:
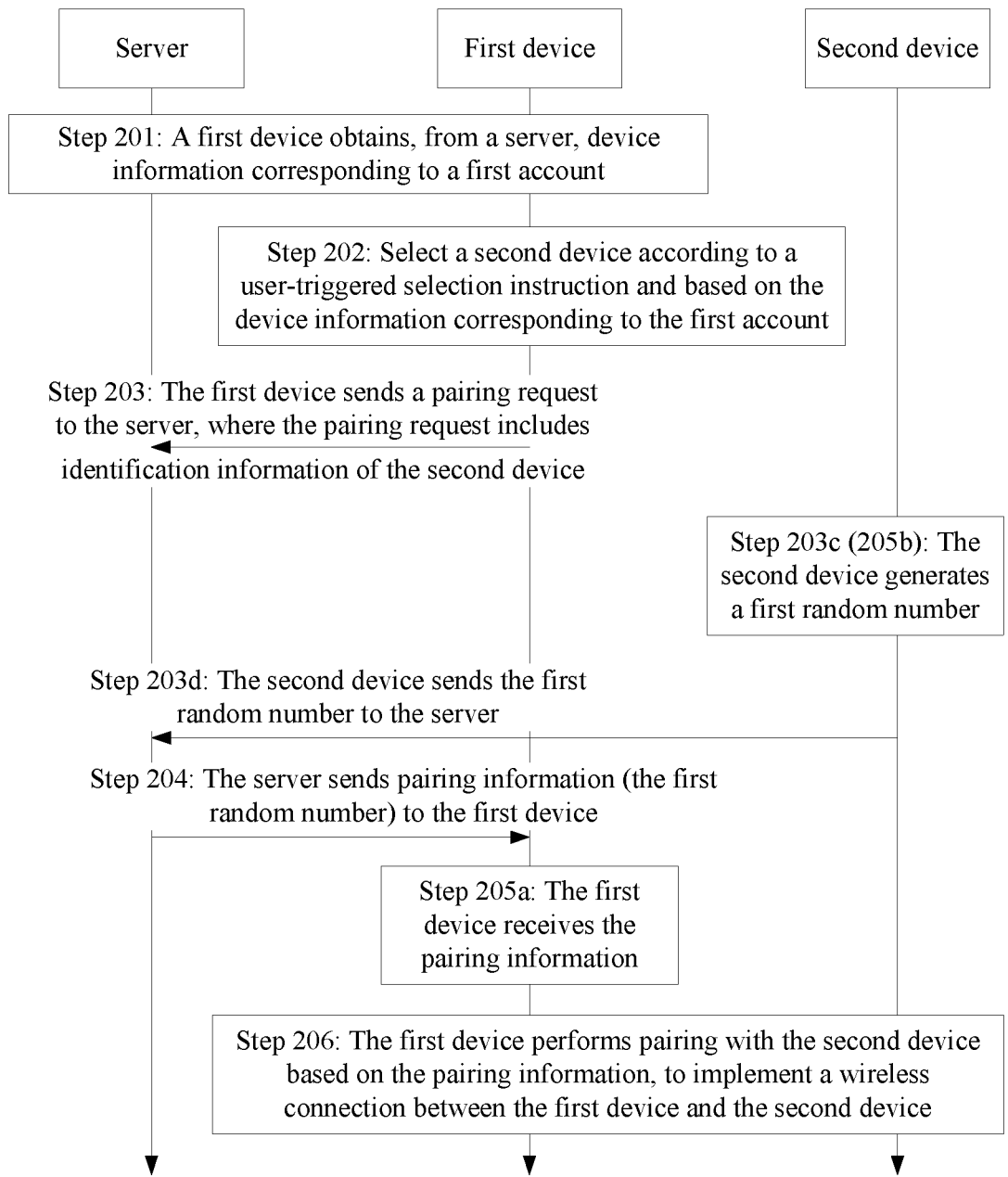
FIG. 7 is a schematic flowchart of a third multi-device wireless connection method according to an embodiment of the present invention.

Second type: The pairing information includes the first random number, and the first random number is generated by the second device and sent to the server. As shown in FIG. 7, before step 204, the method further includes step 203*c* and step 203*d*. A process of step 203*c* and step 203*d* and a process of step 201 to step 203 may be performed in no particular order, provided that before the server sends the pairing information to the first device, the second device generates the first random number and sends the first random number to the server.

Step 203*c*: The second device generates the first random number.

A method for generating the first random number by the second device is similar to the method for generating the first random number by the server. For details, refer to the foregoing descriptions of generating the first random number by the server. Details are not described in this embodiment of this application again.

Moreover, the second device may periodically update the first random number. To be specific, the second device may periodically generate the first random number, and send the generated first random number to the server by performing step 203*d*, so that the server updates the stored first random number.

Step 203*d*: The second device sends the first random number to the server.

The second device may send the first random number to the server when generating the first random number, and the server may store the first random number when receiving the first random number, so that security of the first random number can be ensured. Optionally, a process of sending the first random number by the second device to the server may be alternatively implemented by performing step 200*b*. For details, refer to descriptions in step 200*b*. Details are not described in this embodiment of this application again.

Further, after the first device sends the pairing request including the identification information of the second device to the server, the server may send the first random number to the first device by performing step 204. In addition, after receiving the pairing request sent by the first device, the server may further send device information (for example, a MAC address) of the first device to the second device. After receiving the device information of the first device, the second device may determine that a to-be-connected device is the first device, and set a status of the second device to a connectable state, so that the user does not need to manually perform an operation, and therefore an operation procedure is simplified. For example, the second device has a Bluetooth function. The second device may enable the Bluetooth function of the second device, and set an attribute of the second device to a state in which the second device can be detected by another device. Then, the first device may send a wireless physical connection (for example, a Bluetooth physical connection) request to the second device, or the second device sends a wireless physical connection request to the first device after determining that the to-be-connected device is the first device.

Figure 8:
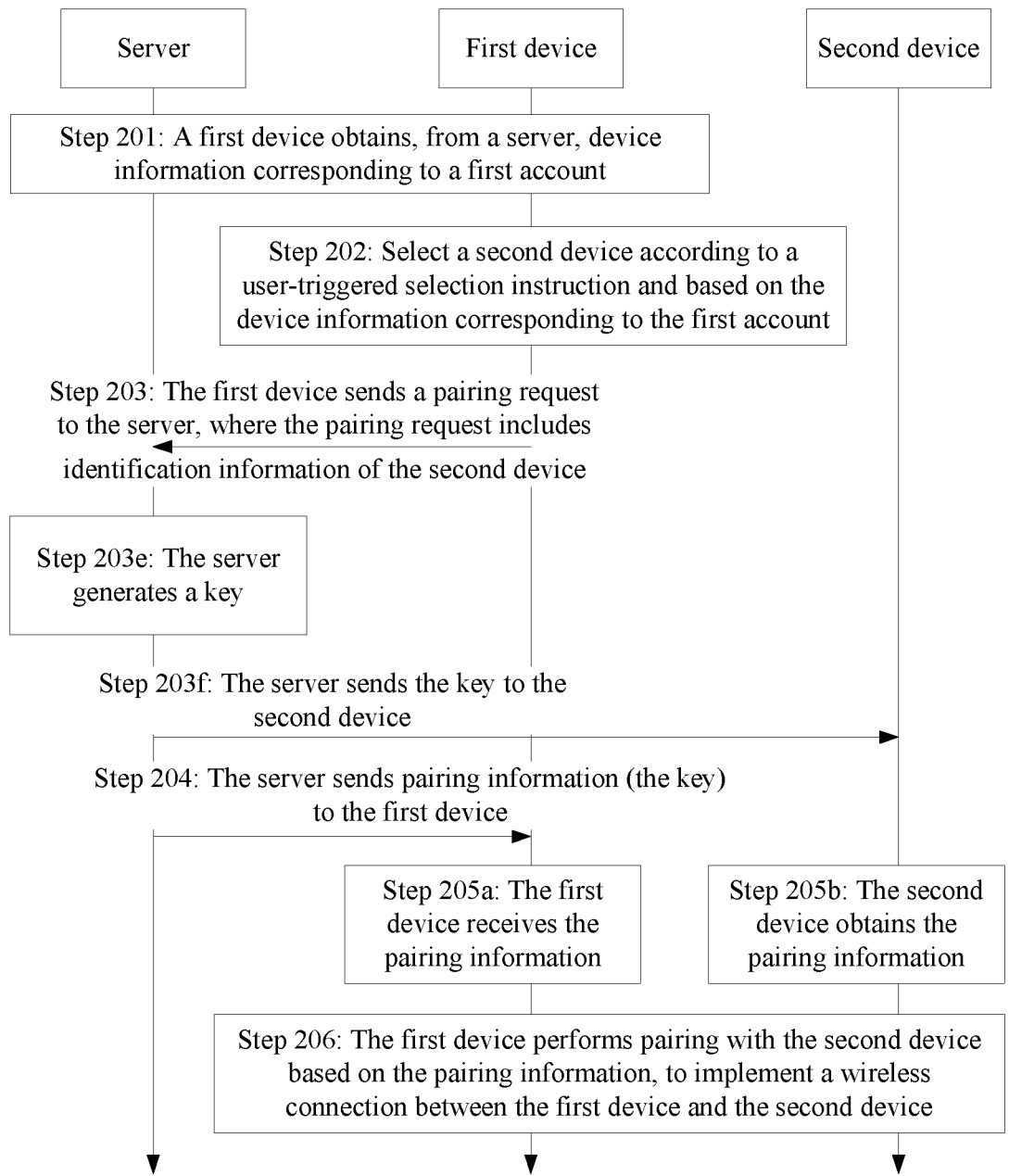
FIG. 8 is a schematic flowchart of a fourth multi-device wireless connection method according to an embodiment of the present invention.

Third type: The pairing information includes the key, and the key is generated by the server. Referring to FIG. 8, after step 203, the method further includes step 203e and step 203f. Step 203e is prior to step 204, and step 203f and step 204 may be performed in no particular order.

Step 203e: The server generates the key.

Step 203f: The server sends the key to the second device.

When receiving the pairing request sent by the first device, the server may generate, for the first device and the second device, the key used by the first device and the second device to encrypt and decrypt data, and send the generated key separately to the first device and the second device. To be specific, the server sends the key to the first device by performing step 204, and sends the key to the second device by performing step 203f, to ensure security of the key and improve efficiency of pairing between the first device and the second device. Optionally, the server may further send device information (for example, a MAC address) of the first device and the key together to the second device. The device information of the first device is used by the second device to determine a to-be-connected device.

Further, when receiving the key, the second device may set a status of the second device to a connectable state, so that the user does not need to manually perform an operation, and therefore an operation procedure is simplified. For example, the second device has a Bluetooth function. The second device enables the Bluetooth function of the second device, and sets an attribute of the second device to a state in which the second device can be detected by another device. Then, the first device may send a wireless physical connection (for example, a Bluetooth physical connection) request to the second device, or the second device sends a wireless physical connection request to the first device after determining that the to-be-connected device is the first device.

Step 205a: The first device receives the pairing information.

Step 205b: The second device obtains the pairing information.

The pairing information may include the first random number or the key. When the pairing information includes different information, a corresponding operation performed by the second device is slightly different. Specifically, a process of obtaining the pairing information by the second device may be receiving the first random number sent by the server corresponding to step 203b, may be step 203c, or may be receiving the key sent by the server corresponding to step 203f. For a specific process, refer to the descriptions in the foregoing steps. Details are not described in this embodiment of this application again.

Step 206: The first device performs pairing with the second device based on the pairing information, to implement a wireless connection between the first device and the second device.

Specifically, when the pairing information includes the first random number, the first device and the second device may separately generate a key based on the first random number by using a specific algorithm, and perform encryption and decryption during data transmission by using the generated key, to implement the wireless connection between the first device and the second device. When the pairing information includes the key, the first device and the second device may directly perform encryption and decryption during data transmission by using the key included in the pairing information, to implement the wireless connection between the first device and the second device.

When wireless connections are being performed between a plurality of devices on which the first account is logged in to, every two of the plurality of devices can be connected by using the method in step 201 to step 205, to implement the connections between the plurality of devices, and the user does not need to perform a series of complex operations on each device. This reduces an operation time and simplifies the operation procedure, thereby improving user experience.

Figure 9:
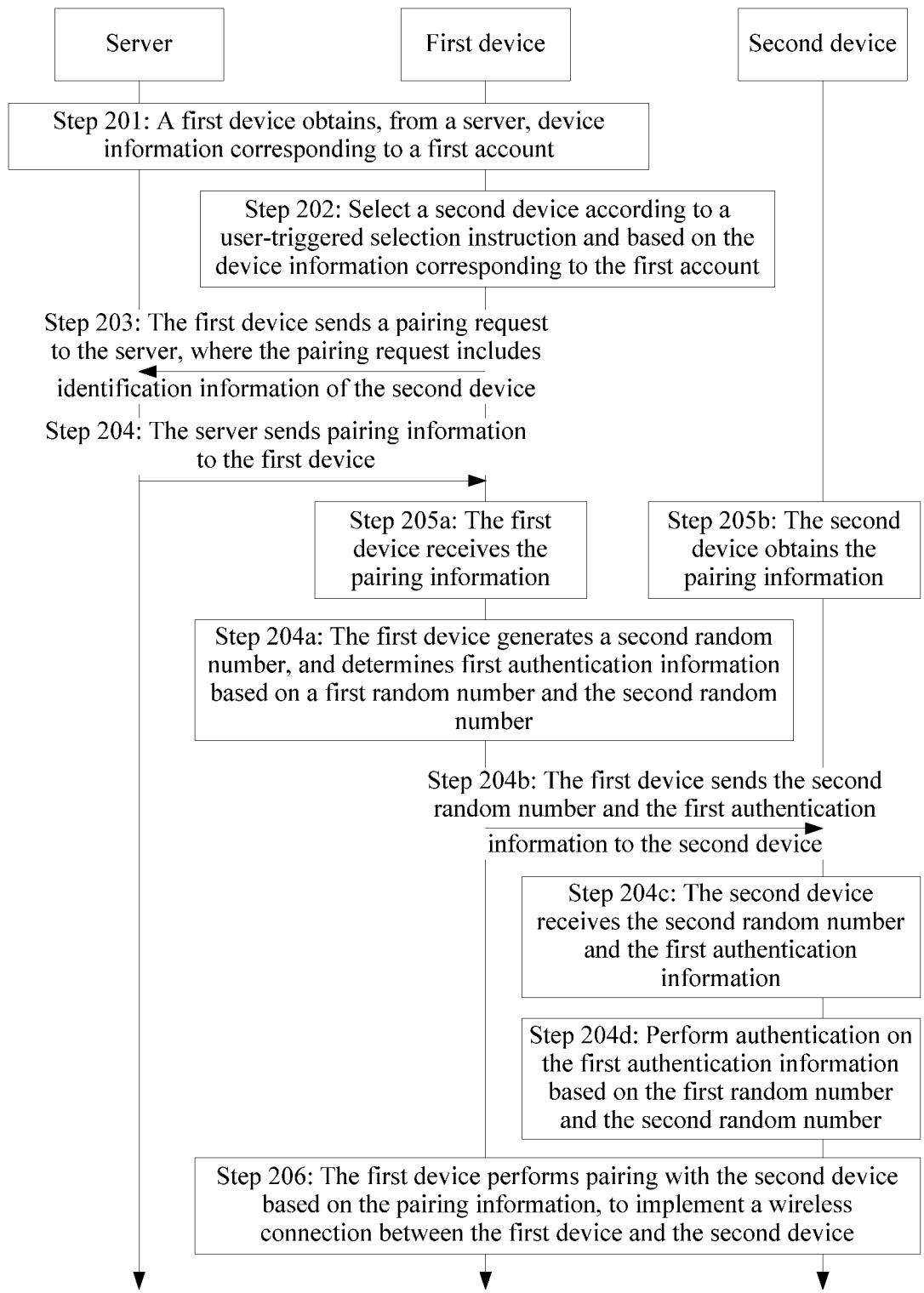
FIG. 9 is a schematic flowchart of a fifth multi-device wireless connection method according to an embodiment of the present invention.

Further, after the first device and the second device obtain the pairing information, if the pairing information includes the first random number, the first device and the second device may further perform validity authentication on each other based on the first random number. With reference to FIG. 4, that the second device performs validity authentication on the first device is used as an example for description. Referring to FIG. 9, after step 205a and step 205b, the method further includes step 204a to step 204d.

Step 204a: The first device generates a second random number, and determines first authentication information based on the first random number and the second random number.

When generating the second random number, the first device may generate the random number according to an algorithm by using time (for example, xx (month) xx (day), xx (year)) as a factor, or may generate the random number by using a random-number generation method in the prior art. A method for generating the second random number by the first device and an algorithm used for generating the second random number are not specifically limited in this embodiment of this application.

Moreover, the first device may generate the first authentication information based on the first random number and the second random number by using an algorithm. The first authentication information may be a random number, a character, a character string, or the like. The algorithm used for generating the first authentication information is not specifically limited in this embodiment of this application, either.

Step 204b: The first device sends the second random number and the first authentication information to the second device, where the first authentication information is used by the second device to perform validity authentication on the first device.

Once generating the first authentication information, the first device may send the second random number and the first authentication information together to the second device, so that the second device performs validity authentication on the first device based on the second random number and the first authentication information.

Step 204c: The second device receives the second random number and the first authentication information that are sent by the first device.

Step 204d: The second device performs authentication on the first authentication information based on the first random number and the second random number.

When receiving the second random number and the first authentication information, the second device may generate authentication information based on the first random number and the second random number by using an algorithm. The algorithm may be the same as the algorithm used by the first device to generate the first authentication information. If the authentication information generated by the second device matches the first authentication information, it may be determined that validity authentication on the first device succeeds, and then the second device may perform a subsequent step. If the generated authentication information does not match the first authentication information, it may be determined that validity authentication on the first device fails, and then the second device may tear down the wireless physical connection.

In addition, the second device and the first device may also perform validity authentication on the second device by using the foregoing method for performing validity authentication on the first device. Specifically, the second device generates a third random number, and determines second authentication information based on the first random number and the third random number, the second device sends the third random number and the second authentication information to the first device, where the second authentication information is used by the first device to perform validity authentication on the second device, and the first device receives the third random number and the second authentication information that are sent by the second device, and performs authentication on the second authentication information based on the first random number and the third random number. Therefore, validity authentication is performed on the first device and the second device, so that security of the wireless connection between the first device and the second device can be ensured.

It should be noted that a specific process of performing validity authentication on the second device and operations performed after authentication succeeds or fails are similar to the foregoing process of performing validity authentication on the first device. For details, refer to the foregoing descriptions. Details are not described in this embodiment of this application again. Moreover, the process of performing validity authentication on the first device and the process of performing validity authentication on the second device may be performed in no particular order.

Figure 10:
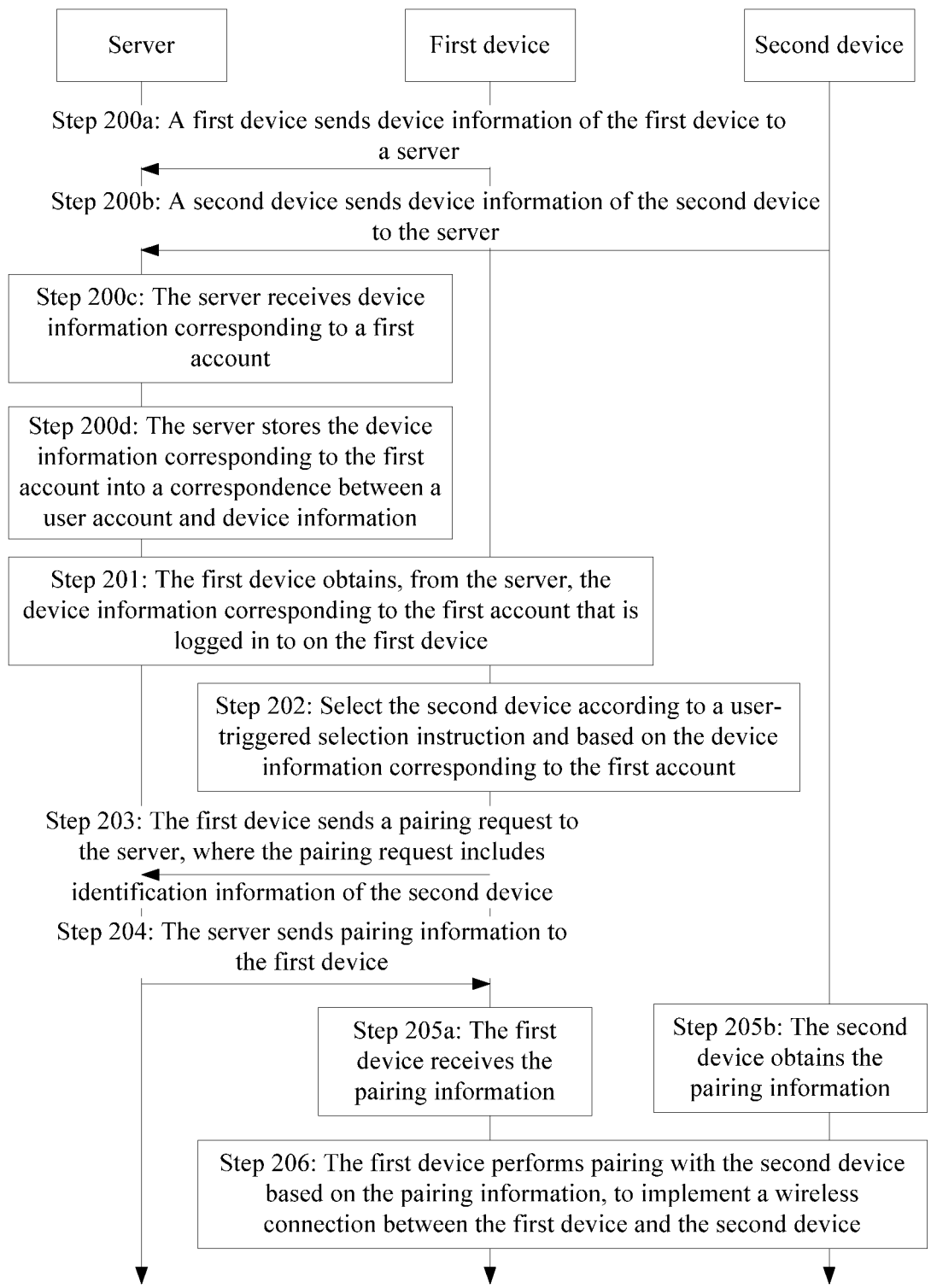
FIG. 10 is a schematic flowchart of a sixth multi-device wireless connection method according to an embodiment of the present invention.

Further, before devices on which the first account is logged in to perform wireless connections by using the method shown in FIG. 4 or FIG. 9, the devices may further send device information of the devices to the server, so that the server stores the device information of the devices. The devices on which the first account is logged in to may separately send the device information of the devices to the server, and a sequence is not limited. With reference to FIG. 4, the first device and the second device are used as an example for description. Referring to FIG. 10, before step 201, the method further includes step 200a to step 200d.

Step 200a: The first device sends device information of the first device to the server when a preset condition is satisfied, where the preset condition includes one of the following conditions: the first account is logged in to on the first device for the first time, or device information of the first device changes.

With respect to sending the device information of the first device to the server, the device information of the first device may be sent to the server each time the first account is logged in to on the first device, or may be sent when the preset condition is satisfied. To be specific, when the first account is logged in to on the first device for the first time, the first device may send the device information of the first device to the server, or when the device information of the first device subsequently changes, for example, when a device name or a Bluetooth name of the first device changes, the first device may send changed device information of the first device to the server.

Step 200b: The second device sends device information of the second device to the server when a preset condition is satisfied, where the preset condition includes one of the following conditions: the first account is logged in to on the second device for the first time, or device information of the second device changes.

A process of sending the device information of the second device by the second device to the server is similar to the process of sending the device information of the first device by the first device to the server. For details, refer to the descriptions in step 200a. Details are not described in this embodiment of this application again.

Further, when sending the device information of the second device to the server, the second device may further add the first random number generated in step 203c to the device information of the second device, to send the device information and the first random number together to the server. Likewise, the first device may generate a random number, and send the generated random number and the device information of the first device to the server by performing step 200a.

The first device and the second device respectively send the device information of the first device and the second device to the server under the preset conditions, so as to avoid sending the device information to the server each time the first account is logged in to. This reduces interactions between the device and the server, and can also ensure freshness of the device information.

Step 200C: The server receives the device information corresponding to the first account.

When devices on which the first account is logged in to send device information of the devices to the server, the server may receive the device information corresponding to the first account. Devices corresponding to the first account are the devices on which the first account is logged in to. That the devices corresponding to the first account include the first device and the second device is used as an example for description in this embodiment of this application. In actual application, the devices corresponding to the first account may further include one or more other devices, and the one or more devices may further send device information of the one or more devices to the server in a similar manner in which the first device and the second device send the device information to the server.

Step 200d: The server stores the device information corresponding to the first account into a correspondence between a user account and device information.

When receiving the device information sent by the device corresponding to the first account, the server may store the device information corresponding to the first account into the correspondence between a user account and device information. The correspondence between a user account and device information may include one or more user accounts and device information corresponding to each user account.

In an example used for description, the devices corresponding to the first account include the first device and the second device, the first device and the second device separately send the device information of the first device and the second device to the server, and the device information includes a device name, a Bluetooth MAC address, and a Bluetooth name. If the first account is No. 11, the device information of the first device is EM1, BT-MAC1, and BT-N1, and the device information of the second device is EM2, BT-MAC2, and BT-N2, the correspondence that is stored in the server and that is between an account name and device information may be listed in Table 1 or shown in FIG. 11(a).

TABLE 1

| User account | Device information |
| --- | --- |
| No. 10 | EM0, BT-MAC0, BT-N0 |
| ... | ... |
| No. 11 | EM1, BT-MAC1, BT-N1 |
|  | EM2, BT-MAC2, BT-N2 |
|  | ... |
| ... | ... |

Figure 11:
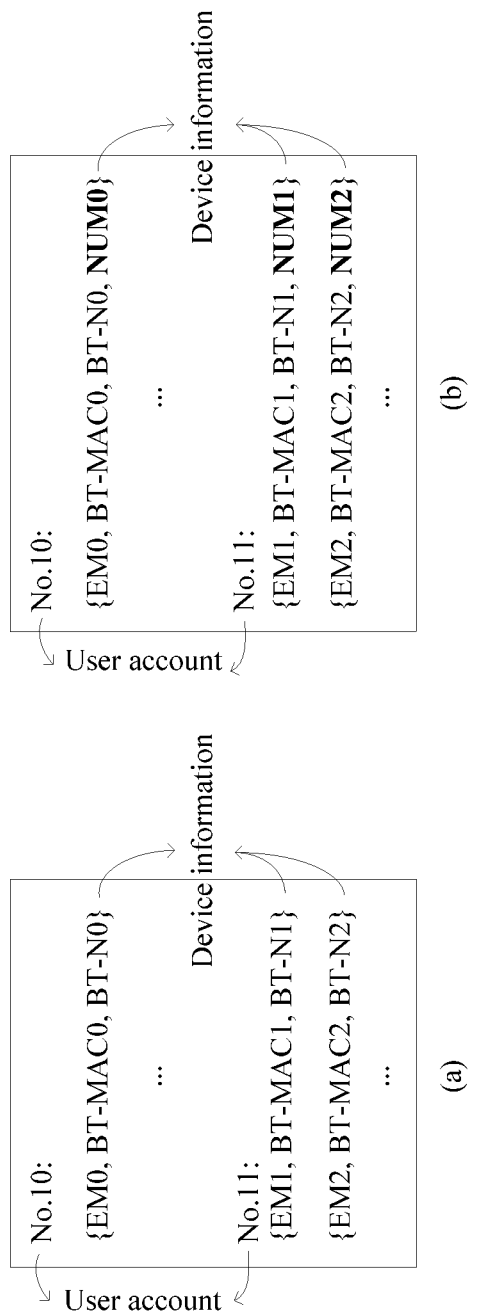
FIG. 11 is a diagram of a correspondence between a user account and device information according to an embodiment of the present invention.

Further, with reference to Table 1, if the device information corresponding to the first account further carries a random number generated by a device, the correspondence that is stored in the server and that is between a user account and device information may be listed in Table 2 or shown in FIG. 11(b). In Table 2, NUM represents a random number.

TABLE 2

| User account | Device information |
| --- | --- |
| No. 10 | EM0, BT-MAC0, BT-N0, NUM0 |
| ... | ... |
| No. 11 | EM1, BT-MAC1, BT-N1, NUM1 |
|  | EM2, BT-MAC2, BT-N2, NUM2 |
|  | ... |
| ... | ... |

It should be noted that the foregoing correspondences between a user account and device information that are listed in Table 1 and Table 2 are merely examples. Table 1 and Table 2 do not constitute any limitation on this embodiment of this application.

Further, if any device on which the first account is logged in to is wirelessly connected to another electronic device, when the device sends device information of the device to the server, the device may further send device information of the connected another electronic device to the server. The another electronic device connected to the device may be a device that does not have an account login function. For example, a smartphone is connected to a smartwatch by using a dedicated application program, and the smartwatch does not have an account login function. The smartphone is connected to the smartwatch by using a Bluetooth function. The smartwatch is incapable of sending device information of the smartwatch to the server, and the smartphone may send the device information of the smartwatch to the server.

Figure 12:
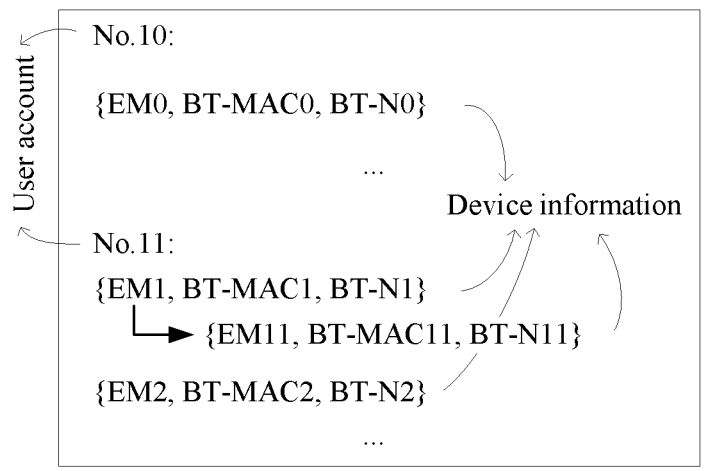
FIG. 12 is another diagram of a correspondence between a user account and device information according to an embodiment of the present invention.

For example, with reference to FIG. 11(a), device information of a third device connected to the second device is EM11, BT-MAC11, and BT-N11. In this case, the server stores the device information of the third device into the correspondence between a user account and device information, as shown in FIG. 12.

It should be noted that a process of performing a wireless connection between the first device and the third device is similar to the process of performing the wireless connection between the first device and the second device, and in the connection process, information sent by the first device and the server to the third device may be transmitted by the second device, and information sent by the third device to the first device may also be transmitted by the second device.

Further, a plurality of devices on which different user accounts are logged in to may also perform wireless connections by using the method provided in this embodiment of this application. Specifically, an interface is configured between the server and the plurality of devices, so that the user obtains device information corresponding to different accounts, and subsequent connections are performed by using the method in this embodiment of this application. For example, after the user uses the first account to implement login on the first device, a screen may be configured in the first device for the user to enter a second account. The second account is an account that is logged in to on a device that the user expects to connect to. After obtaining the second account, the first device may send the second account to the server, so that the server returns device information corresponding to the second account. The first device determines, based on the device information corresponding to the second account, the to-be-connected device for connection.

According to the multi-device wireless connection method provided in this embodiment of this application, the first device obtains the device information corresponding to the first account that is logged in to on the first device, selects the second device according to the user-triggered selection instruction and based on the device information corresponding to the first account, sends the pairing request including the identification information of the second device to the server, receives the pairing information sent by the server, and performs pairing with the second device based on the pairing information, to implement the wireless connection between the first device and the second device. In the connection process, the user does not need to perform a series of complex operations on each device. This reduces an operation time and simplifies an operation procedure, thereby improving user experience.

The foregoing describes the solutions provided in the embodiments of the present invention, mainly from a perspective of an interaction between network elements. It can be understood that, to implement the foregoing functions, the network elements, such as the first device, the second device, and the server, include corresponding hardware structures and/or software modules for performing the functions. A person skilled in the art should be easily aware that the network elements and algorithm steps in the examples described with reference to the embodiments disclosed in this specification can be implemented in a form of hardware or a combination of hardware and computer software in this application. Whether a function is performed by hardware or hardware driven by computer software depends on particular applications and design constraints of the technical solutions. A person skilled in the art may use a different method to implement the described functions for each particular application, but it should not be considered that the implementation goes beyond the scope of the present invention.

In the embodiments of the present invention, the first device, the second device, and the server may be divided into functional modules based on the foregoing method examples. For example, each functional module may be obtained through division in correspondence to each function, or at least two functions may be integrated into one processing module. The integrated module may be implemented in a form of hardware, or may be implemented in a form of a software functional module. It should be noted that the module division in the embodiments of the present invention is an example, is merely a logical function division, and may be other division in actual implementation.

Figure 13:
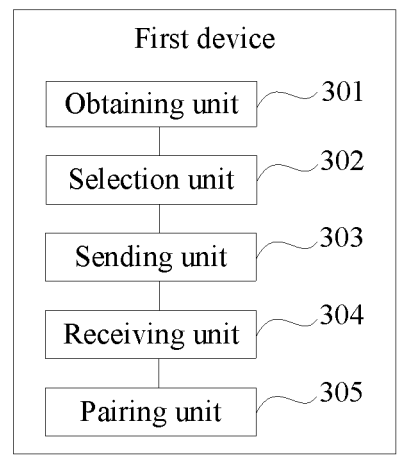
FIG. 13 is a schematic structural diagram of a first device according to an embodiment of the present invention.

When each functional module is obtained through division in correspondence to each function, FIG. 13 is a possible schematic structural diagram of a first device in the foregoing embodiments. The first device includes an obtaining unit 301, a selection unit 302, a sending unit 303, a receiving unit 304, and a pairing unit 305.

The obtaining unit 301 is configured to support the first device in performing step 201 in the method provided in any one of FIG. 4, and FIG. 6 to FIG. 10. The selection unit 302 is configured to support the first device in performing step 202 in the method provided in any one of FIG. 4, and FIG. 6 to FIG. 10. The sending unit 303 is configured to support the first device in performing step 203 in the method provided in any one of FIG. 4, and FIG. 6 to FIG. 10, and step 204b in FIG. 9. The receiving unit 304 supports the first device in performing step 205a in the method provided in any one of FIG. 4, and FIG. 6 to FIG. 10. The pairing unit 305 is configured to support the first device in performing step 206 in the method provided in any one of FIG. 4, and FIG. 6 to FIG. 10, and step 204a in FIG. 9. All related content of the steps in the foregoing method embodiments may be cited in function descriptions of corresponding functional modules. Details are not described herein again.

In hardware implementation, the selection unit 302 and the pairing unit 305 may be a processor, the obtaining unit 301 and the receiving unit 304 may be a receiver, the sending unit 303 may be a transmitter, and the receiver and the transmitter may constitute a communications interface.

Figure 14:
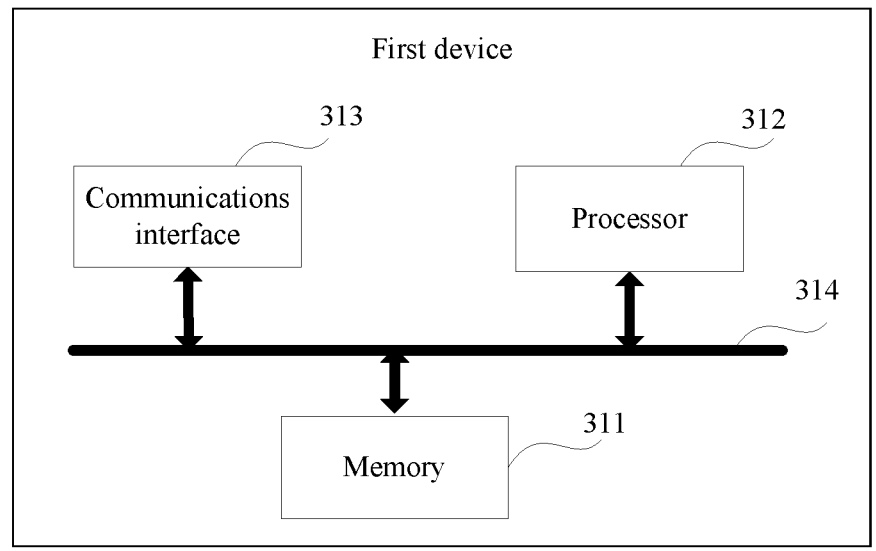
FIG. 14 is a schematic structural diagram of another first device according to an embodiment of the present invention.

FIG. 14 is a possible schematic diagram of a logical structure of a first device in the foregoing embodiments according to an embodiment of the present invention. The first device includes a processor 312, a communications interface 313, a memory 311, and a bus 314. The processor 312, the communications interface 313, and the memory 311 are connected to each other through the bus 314. In this embodiment of the present invention, the processor 312 is configured to control and manage an action of the first device. For example, the processor 312 is configured to support the first device in performing step 202 and step 206 in the method provided in any one of FIG. 4, and FIG. 6 to FIG. 10, and/or other processes of a technology described in this specification. The communications interface 313 is configured to support the first device in performing communication. The memory 311 is configured to store program code and data of the first device.

The processor 312 may be a central processing unit, a general purpose processor, a digital signal processor, an application-specific integrated circuit, a field programmable gate array or another programmable logic device, a transistor logic device, a hardware component, or any combination thereof. The processor 312 may implement or execute various example logical blocks, modules, and circuits described with reference to content disclosed in this application. The processor may alternatively be a combination implementing a computing function, for example, a combination including one or more microprocessors or a combination of a digital signal processor and a microprocessor. The bus 314 may be a peripheral component interconnect (PCI) bus, an extended industry standard architecture (EISA) bus, or the like. The bus may be classified into an address bus, a data bus, a control bus, and the like. For ease of representation, the bus is represented by using only one thick line in FIG. 14. However, it does not indicate that there is only one bus or only one type of bus.

Figure 15:
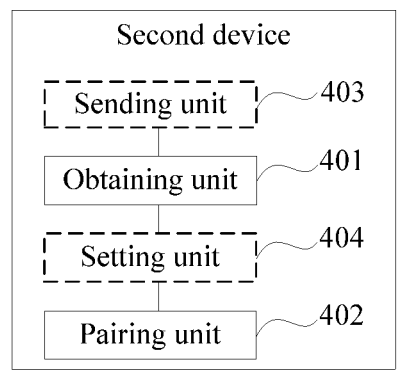
FIG. 15 is a schematic structural diagram of a second device according to an embodiment of the present invention.

When each functional module is obtained through division in correspondence to each function, FIG. 15 is a possible schematic structural diagram of a second device in the foregoing embodiments. The second device includes an obtaining unit 401 and a pairing unit 402. The obtaining unit 401 is configured to support the second device in performing step 205b in the method provided in any one of FIG. 4, and FIG. 6 to FIG. 10. The pairing unit 402 is configured to support the second device in performing step 206 in the method provided in any one of FIG. 4, and FIG. 6 to FIG. 10. Further, the second device further includes a sending unit 403 and/or a setting unit 404. The sending unit 403 supports the second device in performing step 203d in the method provided in FIG. 7 or step 200b in the method provided in FIG. 10. The setting unit 404 is configured to support the second device in setting a status of the second device to a connectable state. All related content of the steps in the foregoing method embodiments may be cited in function descriptions of corresponding functional modules. Details are not described herein again.

In hardware implementation, the pairing unit 402 and the setting unit 404 may be a processor, the obtaining unit 401 may be a receiver, the sending unit 403 may be a transmitter, and the receiver and the transmitter may constitute a communications interface.

Figure 16:
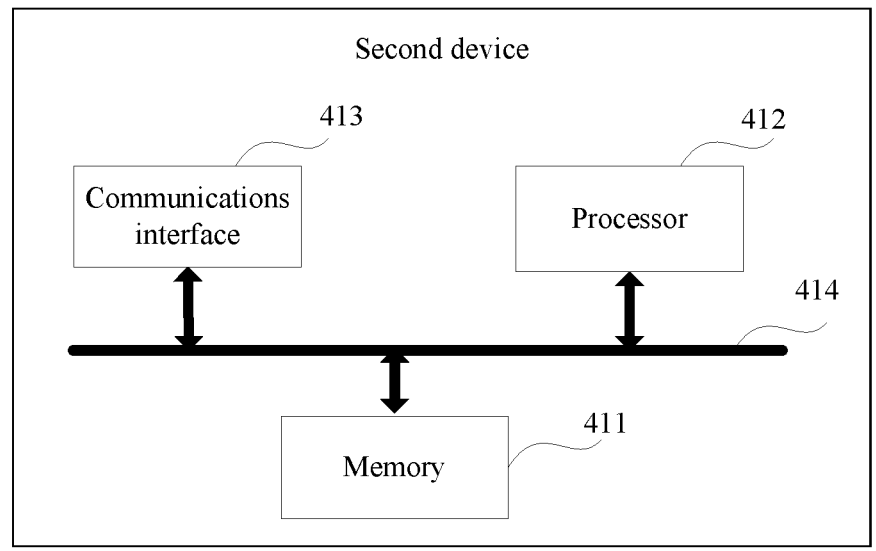
FIG. 16 is a schematic structural diagram of another second device according to an embodiment of the present invention.

FIG. 16 is a possible schematic diagram of a logical structure of a second device in the foregoing embodiments according to an embodiment of the present invention. The second device includes a processor 412, a communications interface 413, a memory 411, and a bus 414. The processor 412, the communications interface 413, and the memory 411 are connected to each other through the bus 414. In this embodiment of the present invention, the processor 412 is configured to control and manage an action of the second device. For example, the processor 412 is configured to support the second device in performing step 206 in the method provided in any one of FIG. 4, and FIG. 6 to FIG. 10, setting a status of the second device to a connectable state, and/or other processes of a technology described in this specification. The communications interface 413 is configured to support the second device in performing communication. The memory 411 is configured to store program code and data of the second device.

The processor 412 may be a central processing unit, a general purpose processor, a digital signal processor, an application-specific integrated circuit, a field programmable gate array or another programmable logic device, a transistor logic device, a hardware component, or any combination thereof. The processor 412 may implement or execute various example logical blocks, modules, and circuits described with reference to content disclosed in this application. The processor may alternatively be a combination implementing a computing function, for example, a combination including one or more microprocessors or a combination of a digital signal processor and a microprocessor. The bus 414 may be a peripheral component interconnect (PCI) bus, an extended industry standard architecture (EISA) bus, or the like. The bus may be classified into an address bus, a data bus, a control bus, and the like. For ease of representation, the bus is represented by using only one thick line in FIG. 16. However, it does not indicate that there is only one bus or only one type of bus.

Figure 17:
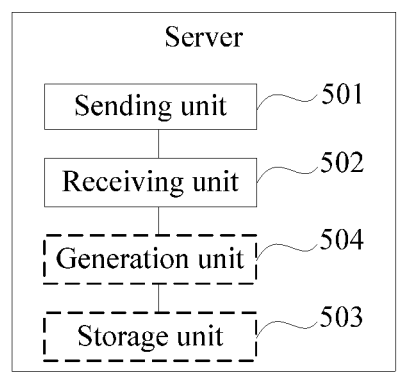
FIG. 17 is a schematic structural diagram of a server according to an embodiment of the present invention.

When each functional module is obtained through division in correspondence to each function, FIG. 17 is a possible schematic structural diagram of a server in the foregoing embodiments. The server includes a sending unit 501 and a receiving unit 502. The sending unit 501 is configured to support the server in performing a step of sending device information corresponding to a first account to a first device, and step 204 in the method provided in any one of FIG. 4, and FIG. 6 to FIG. 10. The receiving unit 502 is configured to support the server in performing a step of receiving a pairing request, a step of receiving a first random number, and step 200C in FIG. 10. Further, the server may further include a storage unit 503 and/or a generation unit 504. The storage unit 503 is configured to support the server in performing step 200d in the method provided in FIG. 10. The generation unit 504 is configured to support the server in performing step 203a in the method provided in FIG. 6 or step 203e in FIG. 8. All related content of the steps in the foregoing method embodiments may be cited in function descriptions of corresponding functional modules. Details are not described herein again.

In hardware implementation, the storage unit 503 may be a memory, the generation unit 504 may be a processor, the sending unit 501 may be a transmitter, the receiving unit 502 may be a receiver, and the transmitter and the receiver may constitute a communications interface.

Figure 18:
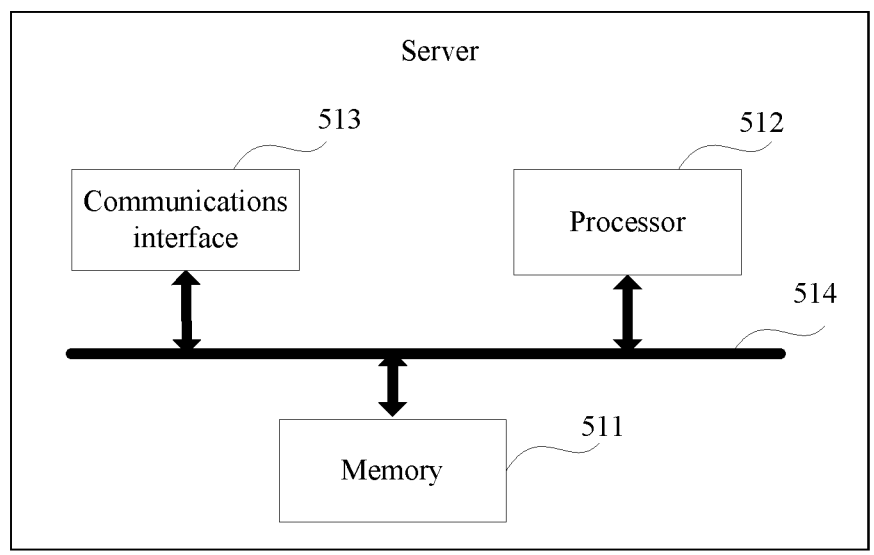
FIG. 18 is a schematic structural diagram of another server according to an embodiment of the present invention.

FIG. 18 is a possible schematic diagram of a logical structure of a server in the foregoing embodiments according to an embodiment of the present invention. The server includes a processor 512, a communications interface 513, a memory 511, and a bus 514. The processor 512, the communications interface 513, and the memory 511 are connected to each other through the bus 514. In this embodiment of the present invention, the processor 512 is configured to control and manage an action of the server. For example, the processor 512 is configured to support the server in performing step 203a in the method provided in FIG. 6, or step 203e in FIG. 8, and/or other processes of a technology described in this specification. The communications interface 513 is configured to support the server in performing communication. The memory 511 is configured to store program code and data of the server.

The processor 512 may be a central processing unit, a general purpose processor, a digital signal processor, an application-specific integrated circuit, a field programmable gate array or another programmable logic device, a transistor logic device, a hardware component, or any combination thereof. The processor 512 may implement or execute various example logical blocks, modules, and circuits described with reference to content disclosed in this application. The processor may alternatively be a combination implementing a computing function, for example, a combination including one or more microprocessors or a combination of a digital signal processor and a microprocessor. The bus 514 may be a peripheral component interconnect (PCI) bus, an extended industry standard architecture (EISA) bus, or the like. The bus may be classified into an address bus, a data bus, a control bus, and the like. For ease of representation, the bus is represented by using only one thick line in FIG. 18. However, it does not indicate that there is only one bus or only one type of bus.

In another embodiment of the present invention, a readable storage medium is further provided. The readable storage medium stores a computer executable instruction, to enable a device (which may be a single-chip microcomputer, a chip, or the like) or a processor to perform the method provided in any one of FIG. 4, and FIG. 6 to FIG. 10. The foregoing readable storage medium may include any medium that can store program code, such as a USB flash drive, a removable hard disk, a read-only memory, a random access memory, a magnetic disk, or an optical disc.

In another embodiment of the present invention, a computer program product is further provided. The computer program product includes a computer executable instruction, and the computer executable instruction is stored in a computer-readable storage medium. At least one processor of a device may read the computer executable instruction from the computer-readable storage medium, and the at least one processor executes the computer executable instruction, so that the device implements the method provided in any one of FIG. 4, and FIG. 6 to FIG. 10.

In another embodiment of the present invention, a system is further provided. The system includes a first device, a second device, and a server. The first device may be the device shown in FIG. 3, FIG. 13, or FIG. 14, and is configured to perform the steps corresponding to the first device in the method in any one of FIG. 4, and FIG. 6 to FIG. 10, and/or the second device is the device shown in FIG. 3, FIG. 15, or FIG. 16, and is configured to perform the steps corresponding to the first device in the method in any one of FIG. 4, and FIG. 6 to FIG. 10, and/or the server is the server shown in FIG. 2, FIG. 17, or FIG. 18, and is configured to perform the steps corresponding to the first device in the method in any one of FIG. 4, and FIG. 6 to FIG. 10.

In the embodiments of this application, the first device obtains the device information corresponding to the first account that is logged in to on the first device, selects the second device according to the user-triggered selection instruction and based on the device information corresponding to the first account, sends the pairing request including the identification information of the second device to the server, receives the pairing information sent by the server, and performs pairing with the second device based on the pairing information, to implement the wireless connection between the first device and the second device. In the connection process, the user does not need to perform a series of complex operations on each device. This reduces the operation time and simplifies the operation procedure, thereby improving user experience.

Finally, it should be noted that the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A multi-device wireless connection method, comprising:

obtaining, by a first device, from a server, device information corresponding to a first account;

selecting a second device according to a user-triggered selection instruction and according to the device information corresponding to the first account, wherein the second device is a device to which the first account is logged in;

sending a pairing request to the server, wherein the pairing request comprises identification information of the second device;

receiving pairing information sent by the server, wherein the pairing information is used for pairing between the first device and the second device, wherein the pairing information comprises a first random number which is generated by the server, or is generated by the second device and sent to the server; and performing, by the first device, pairing with the second device according to the pairing information, and implementing a wireless connection between the first device and the second device, wherein the performing the pairing with the second device comprises:

generating a second random number and determining first authentication information according to the first random number and the second random number; and sending the second random number and the first authentication information to the second device, wherein the first authentication information is sent to the second device to cause the second device to perform, according to a copy of the first random number stored at the second device, validity authentication on the first device.

2. The method according to claim 1, wherein the performing the pairing with the second device further comprises:

receiving a third random number and second authentication information sent by the second device, wherein the second authentication information is used by the first device to perform validity authentication on the second device; and performing authentication on the second authentication information according to the first random number and the third random number.

3. The method according to claim 1, wherein the performing the pairing with the second device further comprises:

generating a key according to the first random number, wherein the key is used by the first device and the second device to encrypt and decrypt data.

4. The method according to claim 1, further comprising:

sending, by the first device, in response to a third device that is wirelessly connected to the first device being incapable of account login, device information of the third device to the server.

5. The method according to claim 4, wherein the third device that is wirelessly connected to the first device and is incapable of account login is a device that lacks account login functionality.

6. The method according to claim 1, wherein the device information corresponding to a first account comprises at least one of a device name, a network media access control (MAC) address, or a network address name.

7. The method according to claim 6, wherein the device information corresponding to a first account further comprises a random number associated with a device associated with the device information.

8. A multi-device wireless connection method, comprising:

obtaining, by a second device, pairing information, wherein the pairing information is used for pairing between a first device and the second device, wherein the second device is a device to which a first account is logged in, wherein the second device is a device that is selected by the first device according to a user-triggered selection instruction and according to device information corresponding to the first account, wherein the first device is a device that sends a pairing request to a server, and wherein the pairing request comprises identification information of the second device; and performing, by the second device, pairing with the first device according to the pairing information, and implementing a wireless connection between the first device and the second device, wherein the pairing information comprises a first random number which is generated by the server, or is generated by the second device and sent to the server, and wherein the performing the pairing with the first device comprises:

receiving a second random number and first authentication information sent by the first device, wherein the first authentication information is used by the second device to perform validity authentication on the first device; and performing, by the second device, authentication on the first authentication information according to the first random number stored at the second device and further according to the second random number.

9. The method according to claim 8, wherein the performing, by the second device, pairing with the first device based on the pairing information further comprises:

generating a third random number, and determining second authentication information based on the first random number and the third random number; and sending the third random number and the second authentication information to the first device, wherein the second authentication information is used by the first device to perform validity authentication on the second device.

10. The method according to claim 8, wherein the performing the pairing with the first device further comprises:

generating a key according to the first random number, wherein the key is used by the first device and the second device to encrypt and decrypt data.

11. The method according to claim 8, further comprising:

sending, by the second device, in response to a third device that is wirelessly connected to the second device being incapable of account login, device information of the third device to the server.

12. The method according to claim 11, wherein the third device that is wirelessly connected to the first device and is incapable of account login is a device that lacks account login functionality.

13. The method according to claim 8, wherein the device information corresponding to a first account comprises at least one of a device name, a network media access control (MAC) address, or a network address name.

14. The method according to claim 13, wherein the device information corresponding to a first account further comprises a random number associated with a device associated with the device information.

15. A multi-device wireless connection method, comprising:

sending, to a first device, device information in stored information indicating a relationship between a user account and device information and corresponding to a first account;

receiving a pairing request sent by the first device, wherein the pairing request comprises identification information of a second device, and wherein the second device is a device that is selected by the first device according to a user-triggered selection instruction and according to the device information corresponding to the first account; and sending pairing information to the first device, and implementing a wireless connection between the first device and the second device, wherein the pairing information is used for pairing between the first device and the second device, wherein the pairing information comprises a first random number or a key, wherein the first random number is generated by a server, or is generated by the second device and sent to a server, and wherein the key is generated by the server;

performing, in response to the pairing information comprising the first random number, at least one of:
- generating, by the server, the first random number in response to the first random number being generated by the server, and sending the first random number to the second device; or
- receiving the first random number sent by the second device in response to the first random number being generated by the second device;

wherein the sending the first random number to the first device causes the first device to send a second random number to the second device, and wherein the first device sending the second random number to the second device causes the second device perform, according to a copy of the first random number stored at the second device, validity authentication on the first device.

16. The method according to claim 15, further comprising performing, in response to the pairing information comprising the key:
generating the key, wherein the key is used by the first device and the second device to encrypt and decrypt data; and
sending the key to the second device.

17. The method according to claim 15, wherein further comprising:
receiving, in response to a third device that is wirelessly connected to the second device or the first device being incapable of account login, device information of the third device, and storing the device information of the third device into the stored information.

18. The method according to claim 17, wherein the third device that is wirelessly connected to the second device or the first device and is incapable of account login is a device that lacks account login functionality.

19. The method according to claim 15, wherein the device information corresponding to a first account comprises at least one of a device name, a network media access control (MAC) address, or a network address name.

20. The method according to claim 19, wherein the device information corresponding to a first account further comprises a random number associated with a device associated with the device information.

* * * * *